(12) United States Patent
Hakui et al.

(10) Patent No.: US 7,922,181 B2
(45) Date of Patent: Apr. 12, 2011

(54) VEHICLE HEIGHT ADJUSTING SYSTEM

(75) Inventors: Takehiko Hakui, Wako (JP); Hajime Hirata, Wako (JP); Hajime Kajiwara, Wako (JP); Kiyoshi Nakajima, Wako (JP); Yoshimitsu Akuta, Wako (JP); Kunimichi Hatano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 786 days.

(21) Appl. No.: 11/649,216

(22) Filed: Jan. 4, 2007

(65) Prior Publication Data

US 2007/0210539 A1 Sep. 13, 2007

(30) Foreign Application Priority Data

Mar. 9, 2006 (JP) ................................ 2006-063580
Mar. 24, 2006 (JP) ................................ 2006-082729
Mar. 24, 2006 (JP) ................................ 2006-082744
Mar. 24, 2006 (JP) ................................ 2006-082748

(51) Int. Cl.
*B60G 17/02* (2006.01)

(52) U.S. Cl. ............... 280/6.157; 280/5.514; 280/43.17; 280/86.75; 267/175; 74/89.23

(58) Field of Classification Search ............... 280/43.17, 280/86.75, 5.514, 6.15, 6.151, 6.153, 6.155, 280/6.157; 267/175–179; 74/89.23
See application file for complete search history.

(56) References Cited

U.S. PATENT DOCUMENTS

| | | | | |
|---|---|---|---|---|
| 3,530,734 A | * | 9/1970 | Wray et al. | 74/89.3 |
| 5,129,273 A | * | 7/1992 | Fukui et al. | 74/89.35 |
| 5,193,408 A | * | 3/1993 | Fukui et al. | 74/89.35 |
| 6,857,625 B2 | * | 2/2005 | Loser et al. | 267/175 |
| 7,469,910 B2 | * | 12/2008 | Munster et al. | 280/5.514 |
| 7,475,883 B2 | * | 1/2009 | Christophel et al. | 280/5.514 |
| 2006/0163863 A1 | * | 7/2006 | Ellmann et al. | 280/788 |

FOREIGN PATENT DOCUMENTS

| | | |
|---|---|---|
| DE | 195 10 032 | 9/1995 |
| JP | 3-048054 A | 3/1991 |
| JP | 05-024871 | 3/1993 |
| JP | 8-19971 A | 3/1996 |
| JP | 11-108100 A | 4/1999 |
| JP | 2005-145388 A | 6/2005 |
| JP | 2005-188613 A | 7/2005 |
| JP | 2005-256924 A | 9/2005 |
| WO | WO 2005/068277 A1 | 7/2005 |

* cited by examiner

*Primary Examiner* — Ruth ILan
(74) *Attorney, Agent, or Firm* — Arent Fox, LLP

(57) ABSTRACT

A first rotor (24; 124) and a second rotor (25; 125) are arranged in a coaxial and mutually rotatable relationship and are provided with a first driven gear (41; 141) and a second driven gear (42; 142), respectively. A drive shaft (31; 131) is also provided with a first drive gear (43; 143) and a second drive gear (44; 144) which are commonly connected to an output shaft of an electric motor (32; 132), and mesh with the first and second driven gears, respectively, at slightly different gear ratios. The first and second rotors are connected via a thread feed mechanism (36; 136) that converts a relative rotation between the first and second rotors into an axial linear movement between the first and second rotors that is used for changing a distance between a vehicle body part and a corresponding end of a suspension spring in a vehicle height adjusting system (9; 109). Owing to a differential rotation of a high gear ratio between the first and second rotors, a significant torque amplification is possible with a compact arrangement. The use of spur gears instead of a worm gear mechanism minimizes torque loss.

9 Claims, 16 Drawing Sheets

VEHICLE HEIGHT ADJUSTING SYSTEM

TECHNICAL FIELD

The present invention relates to a vehicle height adjusting system for a wheel suspension system, and in particular to such a vehicle height adjusting system which is highly compact and light weight.

BACKGROUND OF THE INVENTION

Various types of vehicle height adjusting systems are known. Hydraulic systems and hydro-pneumatic systems are most commonly used for vehicle height adjusting systems. To the end of improving the control precision and simplifying the structure, a proposal has been made to use a worm gear mechanism or a ball screw mechanism powered by an electric motor (see Japanese patent laid open publication No. 11-108100). In this prior proposal, between an upper spring seat supporting an upper, end of a suspension spring and a vehicle body member is interposed a ball screw actuator mechanism. A rotor (male thread member) of the ball screw actuator mechanism is driven by an electric motor so that the space between the upper spring seat and vehicle body member, and hence the vehicle height may be adjusted. In this vehicle height adjusting system, to prevent the electric motor from being turned by the load and to minimize the size of the electric motor, a worm reduction gear mechanism is interposed between the electric motor and rotor.

However, the use of a worm gear mechanism having a relatively low mechanical efficiency gives rise to a number of problems. Because a worm gear mechanism causes a significant torque loss, the electric motor is required to have a correspondingly large output, and this prevents a compact and economical design. A large power consumption is also a problem. These problems may be alleviated to a certain extent by combining the use of a ball screw having a high mechanical efficiency as proposed in the aforementioned Japanese patent publication. However, the use of a ball screw mechanism not only increases the manufacturing cost but also creates the need to prevent the rotation of the female thread member to prevent unintended movement of the ball screw mechanism when an input from the road is applied thereto. However, no such measure is described in this prior application.

Japanese patent publication (kokoku) No. 08-019971 discloses an actuator for a clutch that uses a pair of cylindrical members in a mutually threading engagement in a coaxial relationship to actuate the clutch with an axial relative displacement between them. The two cylindrical members are provided with spur gears that are driven at slightly different gear ratios by corresponding pinion gears mounted on a common drive shaft. The resulting differential rotation between the two cylindrical members is transformed into a relative linear movement thereof by the threading engagement.

This provides a highly compact and high gear ratio mechanism, but the spur gear mounted on the outer cylindrical member is splined thereto to accommodate the linear (axial) movement of the outer cylindrical member in relation to the axially fixed pinion gear and at a position significantly remote from the point of the threading engagement. Therefore, the resulting moment causes a tilting of the outer cylindrical member and this inevitably applies uneven loads to the threading engagement as well as to the spline engagement. Therefore, some improvement is required for this mechanism to be used in a vehicle height adjusting mechanism. Also, the mechanism that can be used in a vehicle height adjusting mechanism must be capable of withstanding the impulsive and oscillatory loads that are applied to the load bearing end of the mechanism.

In such a vehicle height adjusting system, it is important that it is irreversible in the sense that the vibrations, impacts and other inputs from the road surface would not affect the height of the vehicle. It should be ensured that the vehicle height would not change even if there are changes in the viscosity of the lubricating oil or in the friction in the gear meshing parts over time unless it is intended.

BRIEF SUMMARY OF THE INVENTION

In view of such problems of the prior art, a primary object of the present invention is to provide a vehicle height adjusting system which is compact in design.

A second object of the present invention is to provide a vehicle height adjusting system which is durable and reliable in use.

A third object of the present invention is to provide a vehicle height adjusting system which is resistant against inadvertent actuation from the load bearing end.

At least some of these objects of the present invention can be accomplished by providing a vehicle height adjusting system for a wheel suspension system that is configured to be interposed between one of a vehicle end member and a wheel end member, and an opposing end of a suspension spring, the vehicle height adjusting system comprising: a housing connected to said one of the vehicle end member and wheel end member; a spring seat retainer connected to said opposing end of the suspension spring; a first rotor rotatably supported by the housing and provided with a first driven gear along an outer periphery thereof; a second rotor rotatably supported by the spring seat retainer and provided with a second driven gear along an outer periphery thereof, the second rotor being coaxially disposed in relation with the first rotor around a common axial line and joined with the first rotor via a threading coupling that converts a relative rotation around the common axial line into a relative linear movement of the first and second rotors towards and away from each other along the common axial line; a drive shaft rotatably supported by the housing and provided with a first drive gear meshing with the first driven gear and a second drive gear meshing with the second driven gear; and a drive mechanism mounted on the housing for turning the drive shaft; a gear ratio between the first drive gear and first driven gear being different from a gear ratio between the second drive gear and second driven gear.

Thereby, as the drive shaft turns, the first and second rotors are made to turn at a much lower rate so that the rotation of the drive mechanism is transmitted to the threading coupling at an extremely high gear ratio with a minimum torque loss and the torque required for actuating the spring seat retainer relative to the housing can be provided by using a highly compact motor that consumes very little electric power. In particular, because the first and second rotors are disposed in a mutually coaxial relationship, a highly compact and simple arrangement is possible.

If the second drive gear is provided with such a width as to ensure meshing with the second driven gear over an entire linear axial travel of the second rotor relative to the first rotor, no spline coupling is required for any of the gears so that a highly durable and reliable structure can be achieved in a highly simple manner.

According to a preferred embodiment of the present invention, the drive shaft comprises a cylindrical member and the first and second drive gears are formed on an inner periphery of the cylindrical member as internal gears. Because the first and second rotors are thus received within the hollow interior of the drive shaft, the outer dimension of the housing that receive such components can be minimized, and this contributes to a compact design of the vehicle height adjusting system. Also, because the gears are allowed to more intimately mesh with each other, the load acting on each gear tooth can be reduced and noise emission can also be reduced. As an additional advantage, it becomes easier to retain lubricating grease on the gear teeth.

In the vehicle height adjusting system of the present invention, it is important to properly support the reaction that is produced at each gear meshing point and, in particular, to avoid the influences of such gear meshing reactions on the threading coupling. If the suspension spring consists of a coil spring and a damper is coaxially received in the coil spring, the first rotor may be provided with a central bore for passing the damper rod of the damper therethrough to support the first rotor in a rotatable manner via a radial bearing.

If the drive shaft comprises a cylindrical member and the first and second drive gears are formed on an inner periphery of the drive shaft as internal gears, a radial force supporting mechanism may be provided between an inner periphery of the drive shaft and an outer periphery of the second rotor at a location that diagonally oppose a location at which the second drive gear meshes with the second driven gear, the radial force supporting member including a guide plate supported by the housing and a slider guided by the guide plate in an axially slidable but rotationally fast manner, the slider engaging the second rotor in an axially fast but circumferentially slidable manner. It is particularly preferable if the guide plate is made of resilient material so as to resiliently urge the slider against an opposing surface of the second rotor.

If the spring seat retainer comprises a cylindrical extension depending from a lower end of a central part thereof and the housing comprises a cylindrical extension depending from a lower end of a central part thereof and received in the cylindrical extension of the spring seat retainer, a bearing may be interposed between an inner circumferential surface of the cylindrical extension of the spring seat retainer and an outer circumferential surface of the cylindrical extension of the housing. Also, a bearing may be interposed between an inner circumferential surface of the housing and an opposing outer circumferential surface of the second rotor.

In an arrangement that can favorable support the reaction arising from the meshing of the first drive gear and first driven gear, the first rotor is provided with a first disk around which the first driven gear is formed, and a central shaft integrally extending axially from the disk in a coaxial relationship and formed with a male thread for the threading coupling on an outer periphery thereof, and the second rotor is provided with a second disk around which the second driven gear is formed, the upper end of the first disk being formed with a recess coaxial with the first driven gear in which a boss depending from the opposing wall of the housing is rotatably received. Because the gear meshing point and the radial bearing support for the first driven gear may be located on a substantially same plane, the reaction arising from the meshing of the first drive gear and first driven gear can be supported in a favorable manner.

BRIEF DESCRIPTION OF THE DRAWINGS

Now the present invention is described in the following with reference to the appended drawings in which.

DETAILED DESCRIPTION OF THE PREFERRED EMBODIMENTS

Figure 1:
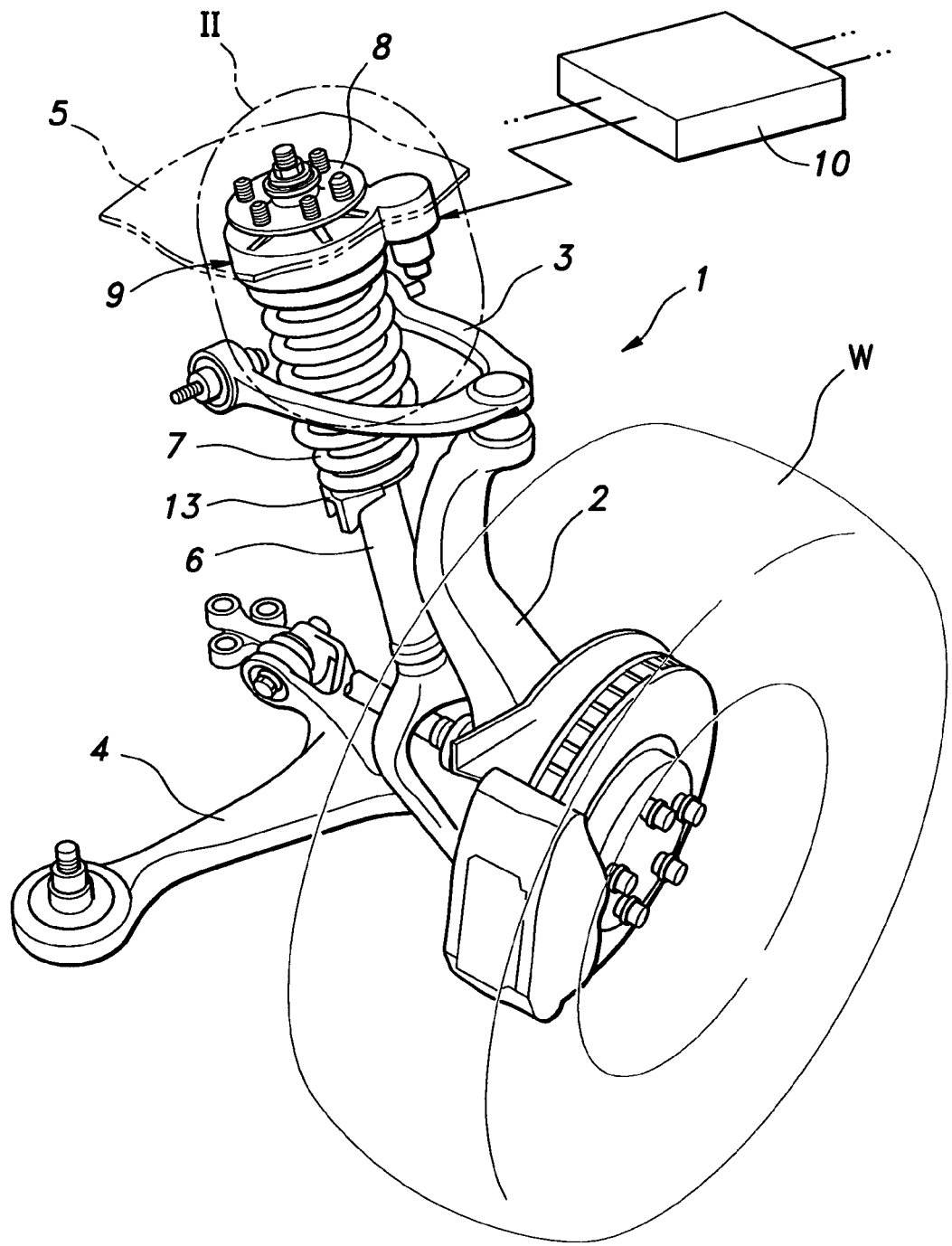
FIG. 1 is a fragmentary perspective view of a front wheel suspension system to which the first embodiment of the present invention is applied.

FIG. 1 shows a front wheel suspension system 1 for an automobile to which the present invention is applied. This suspension system is normally called as a double wishbone type and widely used for the front wheels of automobiles currently on the market. This suspension system 1 comprises a knuckle 2 that rotatably supports a wheel W via a hub bearing (not shown in the drawing), an upper arm 3 that connects an upper end of the knuckle 2 to a part of the vehicle body, a lower arm 4 that connects a lower end of the knuckle 2 to another part of the vehicle body, a damper 6 that connects the lower arm 4 to an upper part of the vehicle body via a damper base 5, a coil spring 7 disposed substantially coaxially around the damper 6 and having two ends that are supported by two opposite ends of the damper 6, respectively, a mount plate assembly 8 for attaching the upper end of the damper 6 to the damper base 5 and a vehicle height adjusting system 9 interposed between the upper end of the spring 7 and mount plate assembly 8. Numeral 10 denotes a drive control unit which is mounted in the cabin or trunk room and is used for controlling the vehicle height adjusting system 9 as will be described hereinafter.

Figure 2:
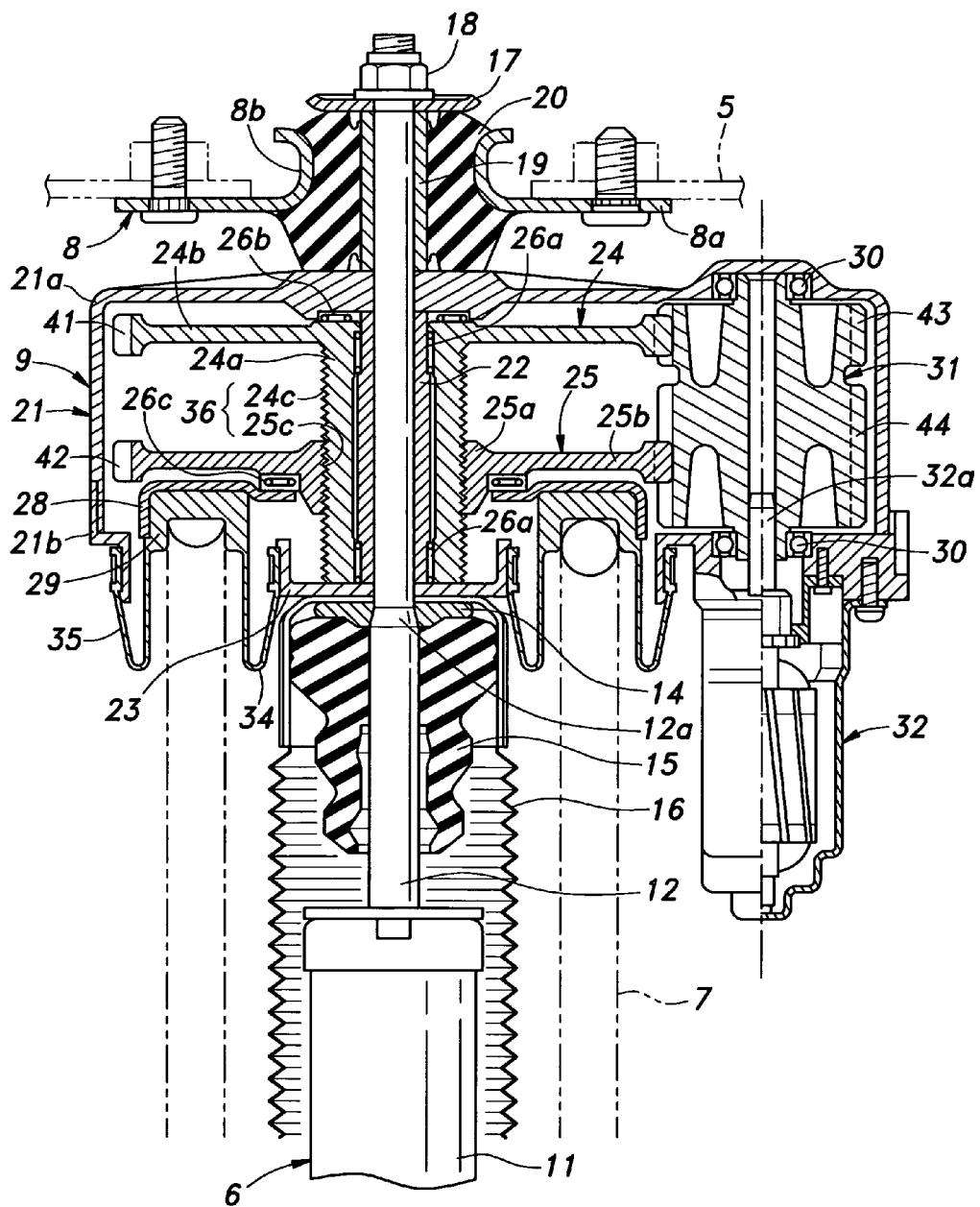
FIG. 2 is an enlarged vertical sectional view of a part of FIG. 1 indicated by II.

Referring to FIG. 2, the damper 6 comprises a damper tube 11 that is filled with working oil, a damper rod 12 extending from an upper end of the damper tube 11, a lower spring seat 13 (see FIG. 1) fixedly attached to the damper tube 11 to support the lower end of the coil spring 7, a retaining ring 14 engaged by a stepped portion 12a of the damper rod 12, a bump stop rubber 15 fitted on the damper rod 12 adjacent to the face of the retaining ring 14 opposing the damper tube 11 to resiliently engage the upper end of the damper tube 11 at the time of full bump and a dust cover 16 fitted on both the damper rod 12 and damper tube 11. The upper end of the damper rod 12 is fastened to the mount plate assembly 8 by using a washer 17 and a nut 18.

The mount plate assembly 8 comprises a plate main body 8a made of stamp formed steel plate and formed with a central boss 8b defining a central opening, a collar 19 fitted on the damper rod 12 and a cylindrical mount rubber 20 joining the central boss 8b of the plate main body 8a with the collar 19. The vehicle height adjusting system 9 of the first embodiment is interposed between the retaining ring 14 and the collar 19 secured to the mount plate assembly 8 via the mount rubber 20.

The vehicle height adjusting system 9 comprises an upper housing half 21a having the shape of an inverted cup and provided with a central opening through which the damper rod 12a passes and a lower housing half 21b fixedly secured to the lower edge of the upper housing half 21a to form a housing 21 for the vehicle height adjusting system 9 jointly with the upper housing half 21a and define a relatively large central opening. A center collar 22 is fitted on the damper rod 12 within the housing 21. The upper end of the center collar 22 abuts a lower surface of the top wall of the upper housing half 21a, and an annular disk 23 also fitted on the damper rod 12 is interposed between the lower end of the center collar 22 and the retaining ring 14.

A first rotor 24 comprises a cylindrical central shaft 24a rotatably fitted on the center collar 22 via needle bearings 26a and formed with a male thread 24c on an outer periphery thereof, and an upper disk 24b integrally and radially extending from the upper end of the central shaft 24a and formed with a first driven gear 41 on an outer periphery thereof. The upper end of the central shaft 24a abuts the opposing lower surface of the upper housing half 21a via a thrust bearing 26b, and the lower end of the central shaft 24a abuts the opposing surface of the annular disk 23.

A second rotor 25 is shaped as a disk 25b having a central boss 25a defining a central bore formed with a female thread 25c that engages the male thread 24c of the first rotor 24. The lower surface of the second rotor 25 engages a spring seat retainer 28 via a thrust bearing 26c. The spring seat retainer 28 retains a spring seat 29 that is made of rubber and engages the upper end of the coil spring 7. The disk 25b of the second rotor 25 is formed with a second driven gear 42 on an outer periphery thereof. The female thread 25c jointly with the male thread 24c forms a feed screw mechanism 36 that causes a relative axial movement between the first and second rotors 24 and 25 when the first and second rotors 24 and 25 are turned around a common axial line relative to each other.

A drive shaft 31 formed with a first drive gear 43 and a second drive gear 44 that mesh with the first driven gear 41 and second driven gear 42, respectively, is rotatably supported by the housing 21 via ball bearings 30, and an electric motor 32 attached to the lower housing half 21b is provided with an output shaft 32a which is fitted into a central bore of the drive shaft 31 in a rotationally fast manner. The central opening of the lower housing half 21b is closed by the spring seat 29 and a radially inner and outer extensions 34 and 35 thereof that are flexible owing to a reduced thickness and joined to the lower end of the lower housing half 21b and the annular disk 23, respectively, at an outer and inner edge thereof.

The first driven gear 41 of the first rotor 24 is provided with Za number of teeth (72 teeth in the illustrated embodiment), and the second driven gear 42 of the second rotor 25 is provided with Zb number of teeth (71 teeth in the illustrated embodiment). The first drive gear 43 of the drive shaft 31 is provided with Zc number of teeth (26 teeth in the illustrated embodiment), and the second drive gear 44 of the drive shaft 31 is provided with Zd number of teeth (26 teeth in the illustrated embodiment). The first drive gear 43 and first driven gear 41 have a substantially same width or axial length, but the second drive gear 44 is given with a substantially greater axial length than the first drive gear 43 so that the meshing relationship between the two gears 43 and 44 may be maintained even when the second rotor 25 is caused to move axially relative to the first rotor 24. In the following description, the first drive gear 43 and first driven gear 41 are called as a first gear pair, and the second drive gear 44 and second driven gear 42 are called as a second gear pair.

Figure 3:
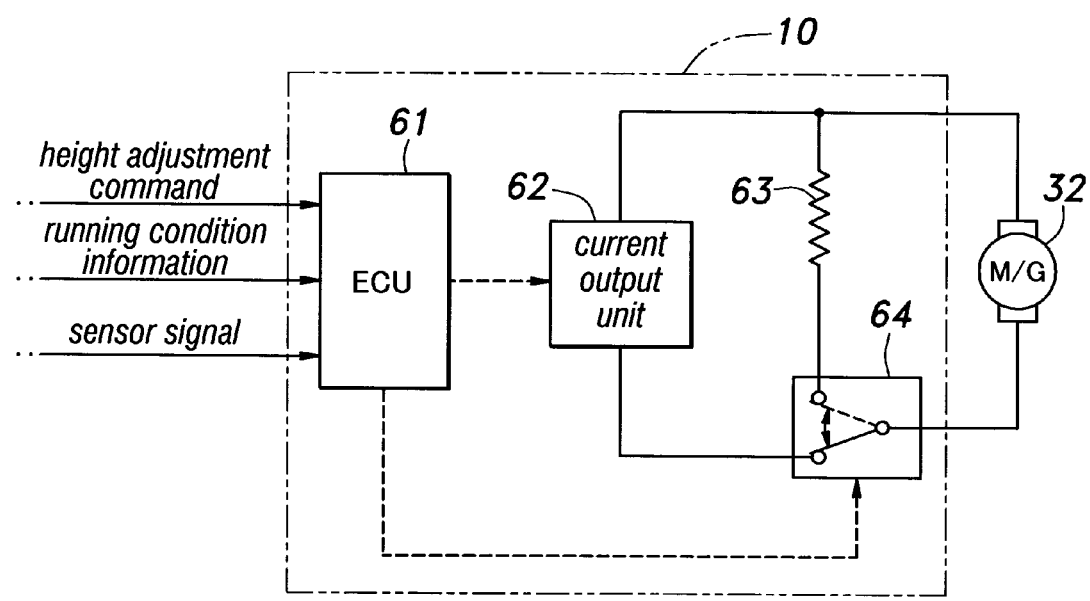
FIG. 3 is a block diagram of the drive control unit for the vehicle height adjusting system of the present invention.

Referring to FIG. 3, the drive control unit 10 comprises an ECU (electronic control unit) 61, a current output unit 62, a DC resistor 63 for applying a electric braking (damping) load to the electric motor 32 and a selection switch 64 for selectively connecting one of the current output unit 62 and DC resistor 63 to the motor 32.

The ECU 61 essentially consists of a microcomputer, ROM, RAM, a peripheral circuit, input/output interface and various driver circuits. The ECU 61 receives a vehicle height adjustment command, running condition information (such as vehicle speed and condition of the wheel suspension system) for each given road condition (traveling at high speed, traveling on irregular road surfaces, etc.), and a sensor signal from a rotary encoder (not shown in the drawing) for measuring the rotational speed of the first rotor. The ECU 61 is connected to both the current output unit 62 and DC resistor 63, and is also connected to the motor 32 via the selection switch 64.

The mode of operation of this embodiment is described in the following.

When engine is running, without regard to if the vehicle is running or stationary, upon manually operating a vehicle height adjusting switch (not shown in the drawing) or upon detecting of a change in the road condition (such as normal road, rough road or freeway), the ECU 61 selects a target height for each wheel, and supplies a corresponding command to the current output unit 62 and selection switch 64. Then, as indicated by the solid line in FIG. 3, the current output unit 62 is connected to the electric motor 32, and electric current is supplied to the electric motor 32.

Figure 4:
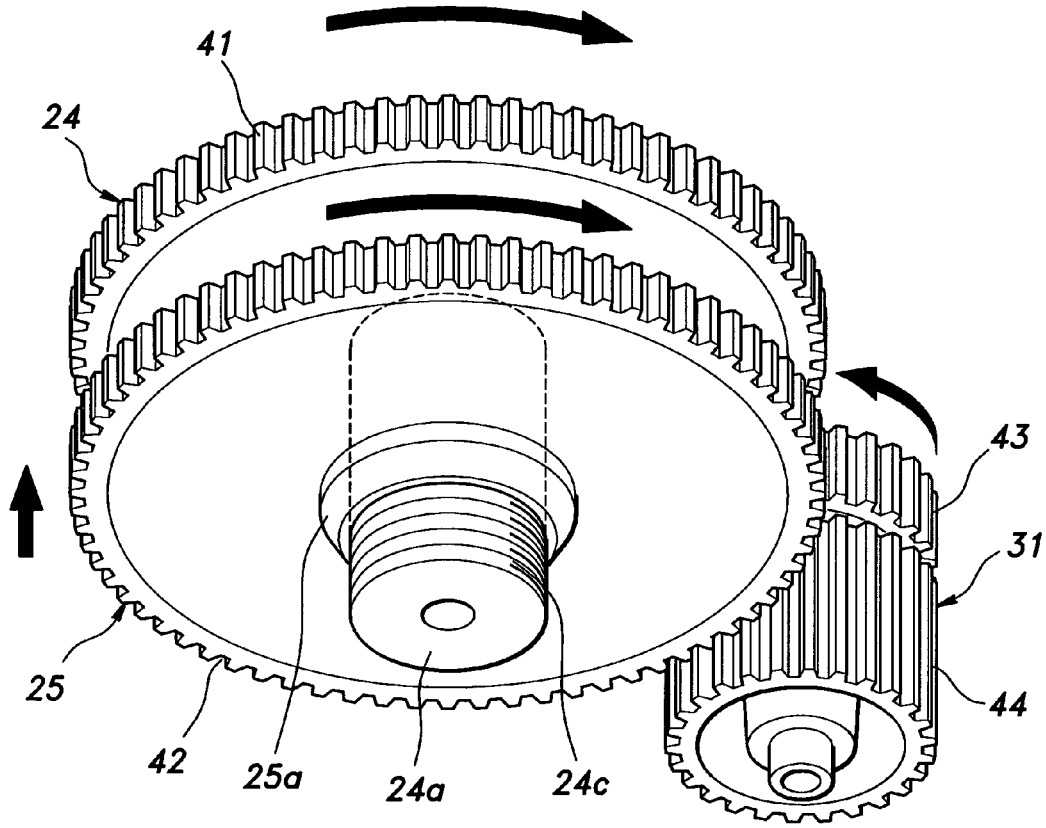
FIG. 4 is a perspective view showing the meshing relationship between the drive shaft and the first and second rotors.
Figure 15:
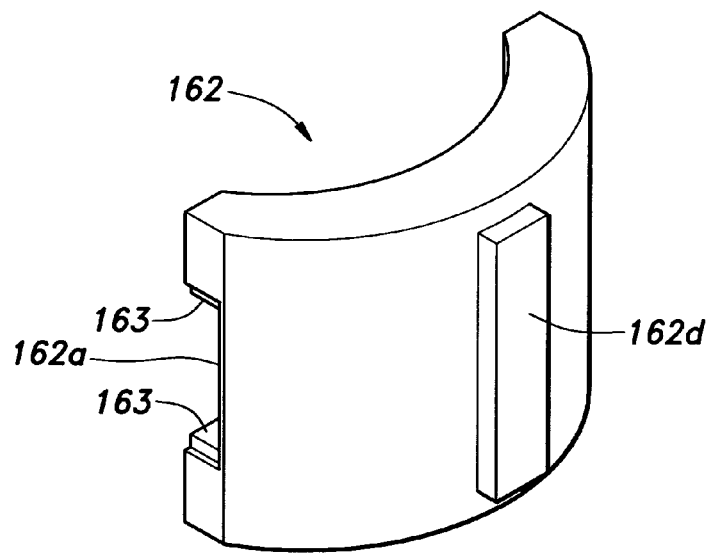
FIG. 15 is a perspective view of the slider showing the back side of the slider.

The rotation of the output shaft 32a of the electric motor 32 turns the drive shaft 31 in a prescribed direction, and this causes the first rotor 24 and second rotor 25 to be turned in the same direction as indicated by the arrows in FIG. 4 owing to the meshing between the first drive gear 43 and first driven gear 41 (the first gear pair) and between the second drive gear 44 and second driven gear 42 (the second gear pair), respectively. The gear ratios of the two gear pairs are as given in the following:

$$R1 = Za/Zc = 72/26 = 2.769 \text{ (the first gear pair)}$$

$$R2 = Zb/Zd = 71/26 = 2.731 \text{ (the second gear pair)}$$

The two gear ratios differ from each other so little that the difference between the rotational angles between the two rotors for a given rotational angle of the drive shaft 31 is very small. The differential gear ratio Rd between the first rotor 24 and second rotor 25 is given by the following relationship.

$$Rd = R1 \cdot R2 / (R1 - R2)$$
$$= 2.769 \cdot 2.731 / (2.769 - 2.731)$$
$$= 199.0$$

Such a difference between the rotational angles of the two rotors causes a relative axial movement between the first rotor 24 and second rotor 25 owing to the operation of the feed screw mechanism 36. In the embodiment illustrated in FIG. 2, because the first rotor 24 is axially fixed in position relative to the housing 21, the second rotor 25 moves up or down relative to the housing 21 depending on the rotational direction of the electric motor 32. Because the lower face of the second rotor 25 abuts the spring seat retainer 28 which in turn engages the upper spring seat 29, the upper spring seat 29 is caused to move vertically in either direction and this changes the distance between the mount plate assembly (vehicle body) 8 and lower arm 4 (wheel W) and hence the vehicle height accordingly.

On the other hand, if the vehicle height adjusting system 9 is not manually activated, there is no change in the road condition, or the key switch is turned off, the ECU 61 forwards a stop command to the selection switch 64. Then, as indicated by the broken line in FIG. 3, the electric motor 32 is connected to the current resistor 63, and the electric braking load is thereby applied to the electric motor 32.

In this embodiment, the overall gear ratio Rd was 199.0 and the lead of the screw feed mechanism was 3 mm. Therefore, the electric motor 32 is required to turn 199 times for the upper spring seat 29 to be raised by 3 mm. Because of such a large gear ratio, even when the electric load applied by the current resistor 63 to the electric motor 32 is very small, the lifting of the upper spring seat 29 or the reduction in the vehicle height would not occur. Therefore, even when there are changes in the viscosity of the lubricating oil or in the friction in the gear meshing parts over time, an inadvertent reduction in the vehicle height can be effectively avoided.

According to this embodiment, an extremely high gear ratio can be achieved using only spur gears that are not only small in number but also arranged in a compact fashion. Therefore, the electric motor 32 may be required to produce a small output, and may therefore be highly compact and inexpensive. The combination of the highly compact gear arrangement and compact electric motor permits the vehicle height adjusting system 9 to be designed as a highly compact unit that can be fitted in a wide range of vehicles. Furthermore, the combination of the use of the thread and high gear ratio prevents the force that may be applied to the second rotor 25 from the load or road input from turning the electric motor 32. Therefore, no special arrangement is required for preventing the inadvertent movement of the second rotor 25.

Figure 5:
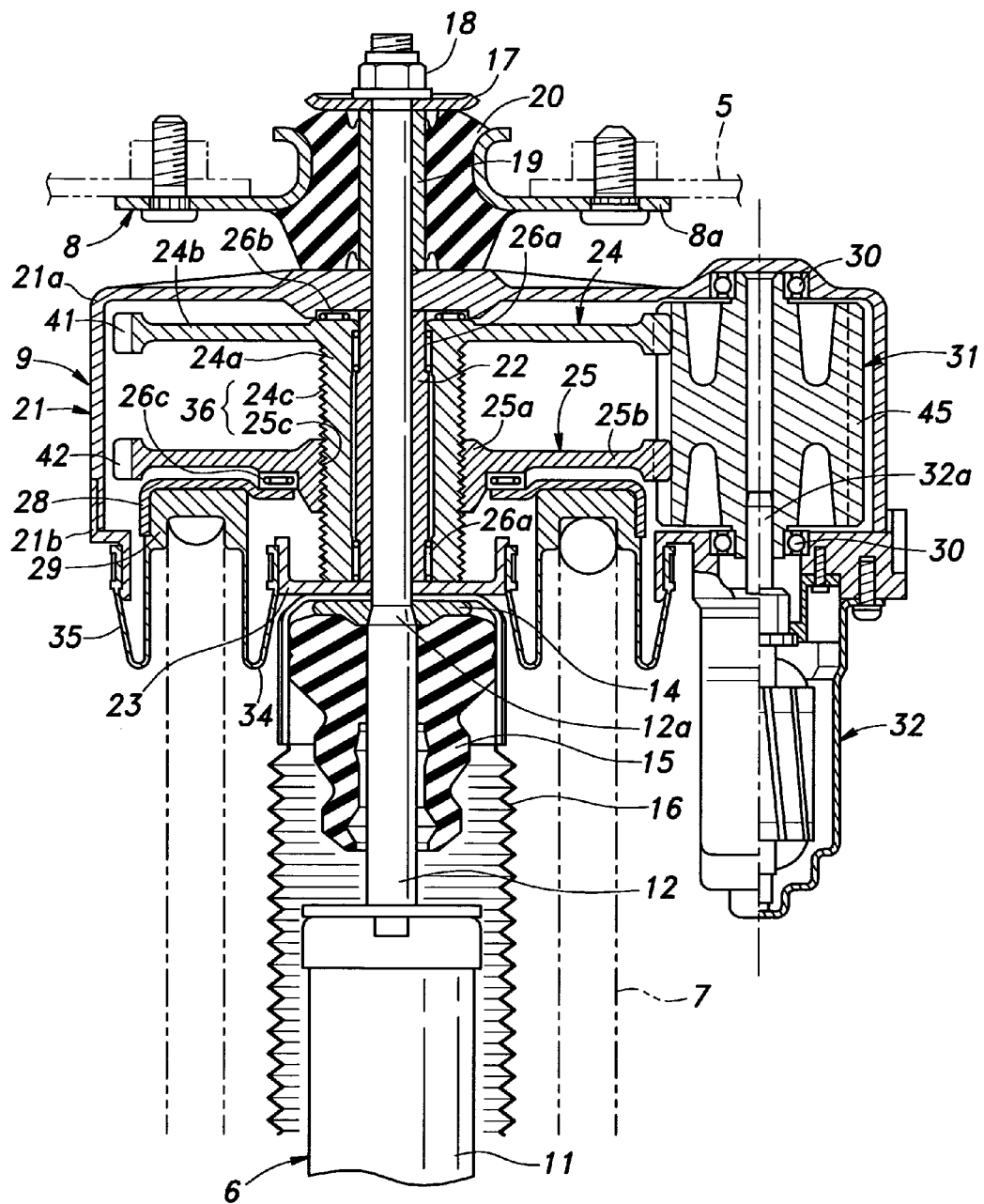
FIG. 5 is a view similar to FIG. 2 showing the second embodiment of the present invention.

FIG. 5 shows a second embodiment of the present invention which is similar to the previous embodiment but differs only in the arrangement of the gears. In the following description of this embodiment in reference to FIG. 5, the parts corresponding to those of the previous embodiment are denoted with like numerals without repeating the description of such parts.

In this embodiment, the drive shaft 31 is provided with a single drive gear 45 which commonly meshes with both the first and second driven gears 41 and 42 which are similar to those of the previous embodiment. The drive gear 45 is accordingly provided with an adequate gear width that accommodates the simultaneous meshing with the two driven gears 41 and 42 and the expected axial movement of the second driven gear 42. The first and second driven gears 41 and 42 may have a same tooth profile and module, but may have different profile shifts (addendum modification coefficient) to ensure a favorable meshing of the gears. In this embodiment, because only a single drive gear 45 is required to be prepared, the manufacturing cost of the drive shaft 31 can be reduced.

Figure 6:
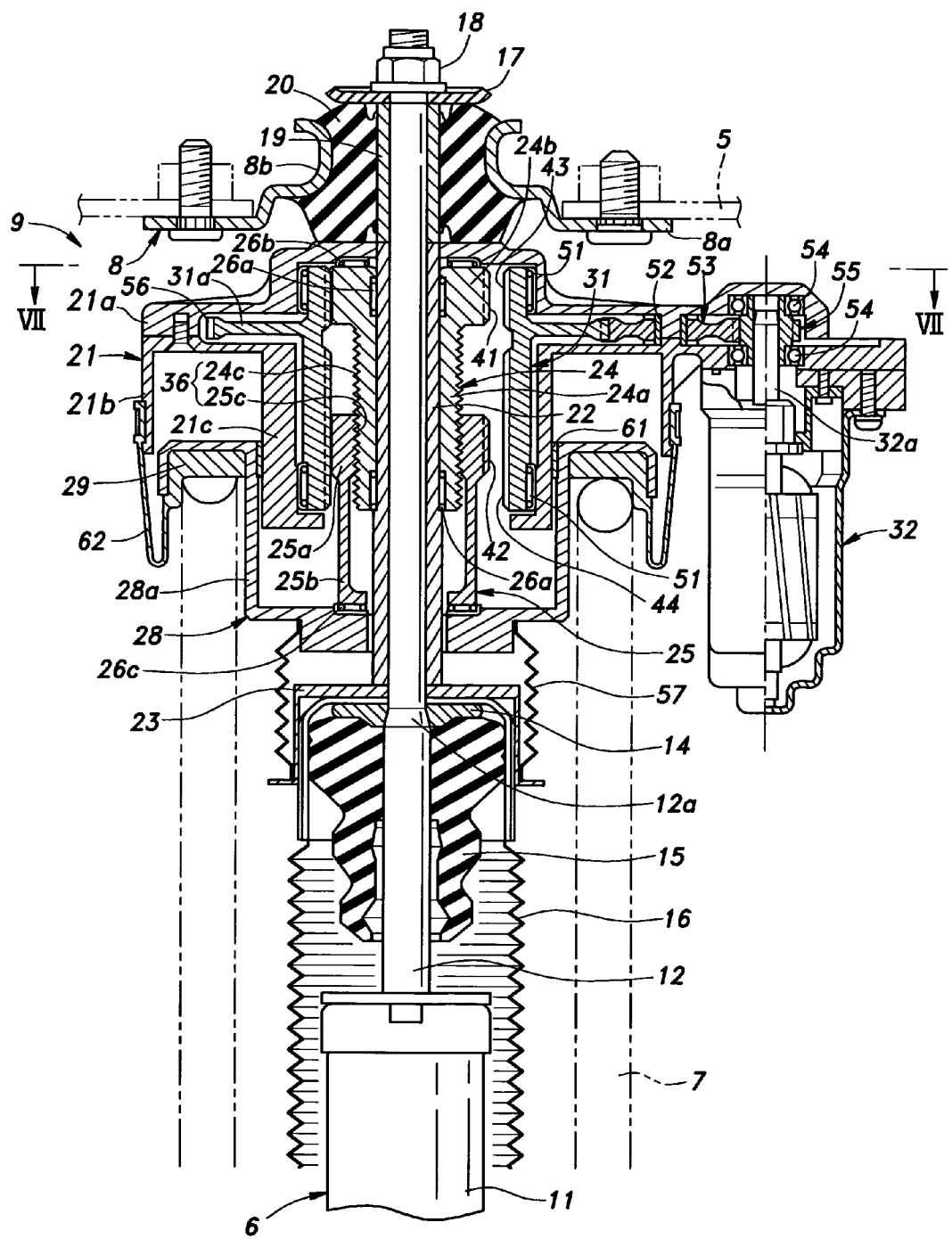
FIG. 6 is a view similar to FIG. 2 showing the third embodiment of the present invention.
Figure 7:
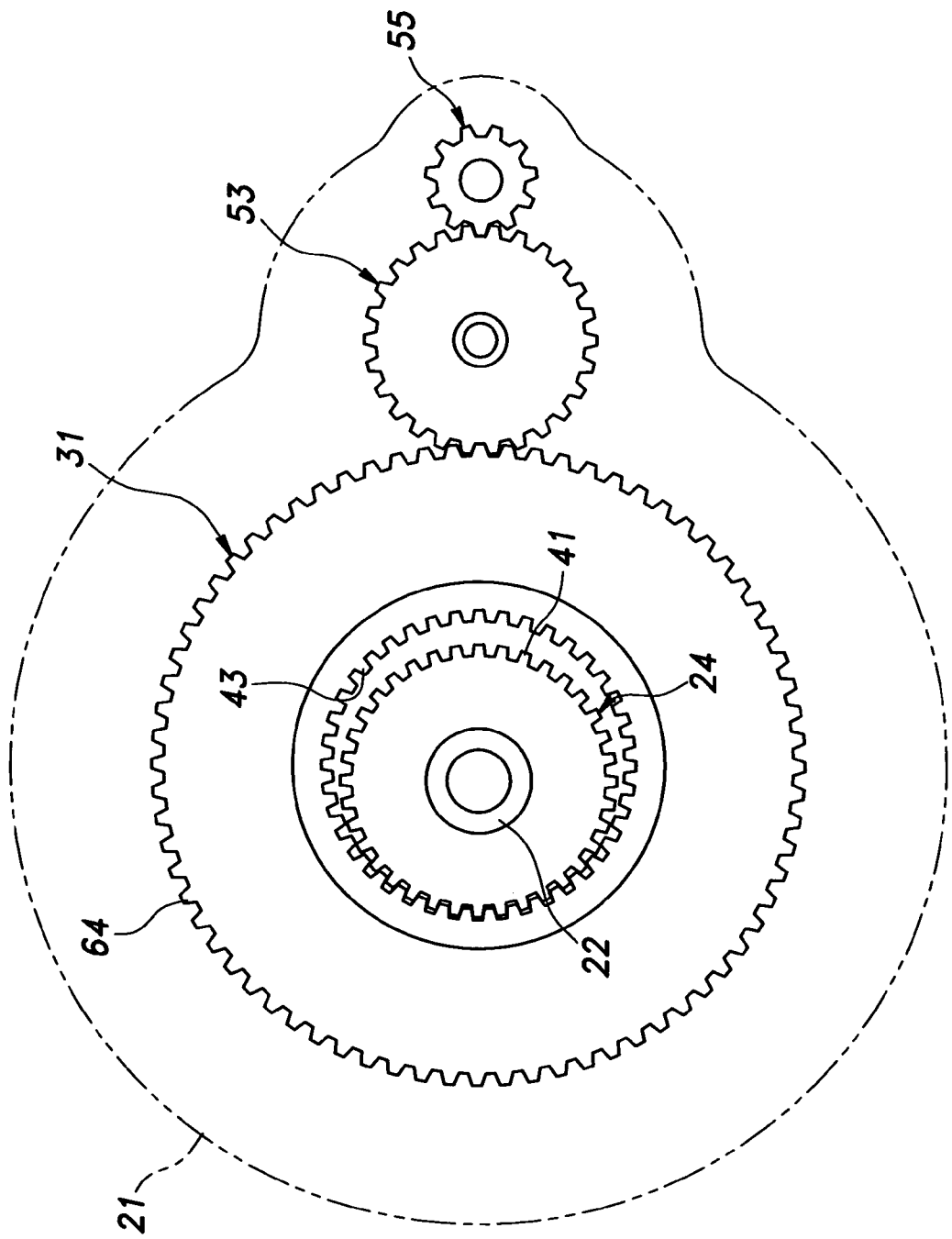
FIG. 7 is a cross sectional view taken along line VII-VII of FIG. 6.

FIGS. 6 and 7 show a third embodiment of the present invention which is similar to the previous embodiments. In the following description of this embodiment in reference to FIGS. 6 and 7, the parts corresponding to those of the previous embodiments are denoted with like numerals without repeating the description of such parts.

Referring to FIG. 6, an upper housing half 21a is provided with a relatively small vertical dimension, and a lower housing half 21b is provided with a cylindrical extension 21c extending downwardly in a central part of the lower housing half 21b. The upper housing half 21a, lower housing half 21b and the cylindrical extension 21c jointly form a housing 21. The inner circumferential surface of the cylindrical extension 21c defines a cylindrical surface somewhat eccentric to the axial center of the housing 21 through which the bumper rod 12 passes.

In this embodiment, a central collar 22 is fitted on the bumper rod 12 within the housing 21, and is provided with an upper end that abuts the lower end of the collar 19 and a lower end that abuts the upper surface of an inverted cut-shaped annular disk 23 fitted on the damper rod 12. The annular disk 23 is in turn supported by a retaining ring 14 engaged by a stepped portion 12a of the bumper rod 12.

A first rotor 24 comprises a cylindrical shaft portion 24a rotatably fitted on the center collar 22 via needle bearings 26a and formed with a male thread 24c on an outer periphery thereof, and a disk portion 24b formed in an upper end portion of the shaft portion 24a and provided with an upper end that abuts the opposing surface of the upper housing part 21a via a thrust bearing 26b. The outer periphery of the disk portion 24b is formed with a first driven gear 41.

A second rotor 25 comprises a hub portion 25a formed with a female thread 25c that engages with the male thread 24c of the first rotor 24, and a cylindrical portion 24b extending from the lower end of the hub portion 25a and abutting the opposing surface of a spring seat retainer 28 at a lower end thereof via a thrust bearing 26c as described hereinafter. The male thread 24c and female thread 25c jointly forms a feed screw mechanism 36 that causes a relative axial movement between the first and second rotors 24 and 25 when the first and second rotors 24 and 25 are turned around a common axial line relative to each other.

The spring seat retainer 28 of this embodiment is provided with a central extension 28a that closely surrounds the damper rod 12 and defines a surface for supporting the lower end of the cylindrical portion 25b of the second rotor 25 via the thrust bearing 26c. The spring seat retainer 28 retains a spring seat 29 made of rubber on a lower surface thereof. A thin extension 62 extends from the outer periphery of the upper spring seat 29 and is connected to the outer periphery of the lower casing half 21b. The lower end of the center collar 22 is supported by the retaining ring 14 via the annular disk 23. A bellows-like dust boot 57 extends from the lower end of the central portion of the cylindrical extension 28a of the spring seat retainer 28 to the annular disk 23 to prevent intrusion of foreign matters from a gap that may be present between the center collar 22 and the central portion of the cylindrical extension 28a of the spring seat retainer 28.

A cylindrical slide bearing 61 is interposed between the outer periphery of the cylindrical extension 21c of the lower housing half 21b and the opposing surface of the spring seat retainer 28 to minimize the friction when the spring seat retainer 28 moves vertically relative to the cylindrical extension 21c.

An electric motor 32 is attached to the lower housing half 21b and is provided with an output shaft 32a that projects into the interior of the housing 21 and rotatably supported by ball bearings 54. The output shaft 32a is fitted with a drive pinion 55 which meshes with an idler gear 53 rotably supported by a slide radial bearing 52.

Centrally inside the housing 21 is rotatably received a drive shaft 31 which is cylindrical in shape and has an axial center line slightly offset from the center line of the damper rod 12. A pair of needle bearings 26a are interposed between the outer periphery of the drive shaft 31 and the inner periphery of the housing 21. The drive shaft 31 is formed with a first drive gear 43 and a second drive gear 44 in an axially spaced relationship on an inner periphery thereof. The drive shaft 31 is further provided with a external radial flange 31a in an upper part thereof which is formed with an input gear 56 that meshes with the idler gear 53. In this embodiment, the input gear 56 has 72 teeth, and the drive pinion 55 has 11 teeth so that the gear ratio Rp of the first gear reduction mechanism interposed between the output shaft of the electric motor and the drive shaft is given by the following relationship.

$Rp = 72/11 = 6.545$

As best illustrated in FIG. 7, the first drive gear 43 meshes with the first driven gear 41, and the second drive gear 44 similarly meshes with the second driven gear 42 although this gear pair is hidden from view in FIG. 7. The first driven gear 41 of the first rotor 24 is provided with Za number of teeth (35 teeth in the illustrated embodiment), and the second driven gear 42 of the second rotor 25 is provided with Zb number of teeth (36 teeth in the illustrated embodiment). The first drive gear 43 of the drive shaft 31 is provided with Zc number of teeth (40 teeth in the illustrated embodiment), and the second drive gear 44 of the drive shaft 31 is provided with Zd number of teeth (40 teeth in the illustrated embodiment). The first drive gear 43 and first driven gear 41 have a substantially same width or axial length, but the second drive gear 44 is given with a substantially greater axial length than the first drive gear 43 so that the meshing relationship between the two gears 43 and 44 may be maintained even when the second rotor 25 is caused to move axially relative to the first rotor 24. In the following description, the first drive gear 43 and first driven gear 41 are called as a first gear pair, and the second drive gear 44 and second driven gear 42 are called as a second gear pair.

The mode of operation of the third embodiment is described in the following with reference to FIG. 6. When the electric motor 32 is turned by a drive current supplied by the drive control unit 10, the drive pinion 55 attached to the output shaft 32a of the electric motor 32 starts turning, and this rotational movement is transmitted to the drive shaft 31 via the first gear reduction mechanism at the gear ratio of Rp=6.545 as mentioned earlier. The rotation of the drive shaft 31 is transmitted to the first rotor 24 via the first gear pair consisting of the first drive gear 43 and first driven gear 41 that mesh with each other, and to the second rotor 25 via the second gear pair consisting of the second drive gear 44 and second driven gear 42. The gear ratios R1 and R2 of the first and second gear pairs, respectively, are given by the following relationships.

$R1 = Za/Zc = 36/40 = 0.900$ (the first gear pair)

$R2 = Zb/Zd = 35/40 = 0.875$ (the second gear pair)

The two gear ratios differ from each other so little that the difference between the rotational angles between the two rotors for a given rotational angle of the drive shaft 31 is very small. The overall gear ratio Rd between the first rotor 24 and second rotor 25 is given by the following relationship.

$$Rd = RP \cdot R1 \cdot R2 / (R1 - R2)$$
$$= 6.545 \cdot 0.900 \cdot 0.875 / (0.900 - 0.875)$$
$$= 206.2$$

The relative rotation between the first rotor 24 and second rotor 25 causes the second rotor 25 to be axially (vertically) displaced relative to the first rotor 24, and this causes the spring seat retainer 28 to be moved vertically. Because the lower face of the second rotor 25 abuts the spring seat retainer 28 which in turn engages the upper spring seat 29, the upper spring seat 29 is caused to move vertically in either direction and this changes the distance between the mount plate assembly (vehicle body) 8 and lower arm 4 (wheel W) and hence the vehicle height accordingly.

In the third embodiment, because the first and second rotors 24 and 25 are received within the hollow interior of the drive shaft 31, and the first and second driven gears mesh with the corresponding first and second drive gears that are formed as internal gears, the outer dimension of the housing 21 can be minimized, and this contributes to a compact design of the vehicle height adjusting system 9. Also, because the gears are allowed to more intimately mesh with each other, the load acting on each gear tooth can be reduced and noise emission can also be reduced. As an additional advantage, it becomes easier to retain lubricating grease on the gear teeth.

Figure 8:
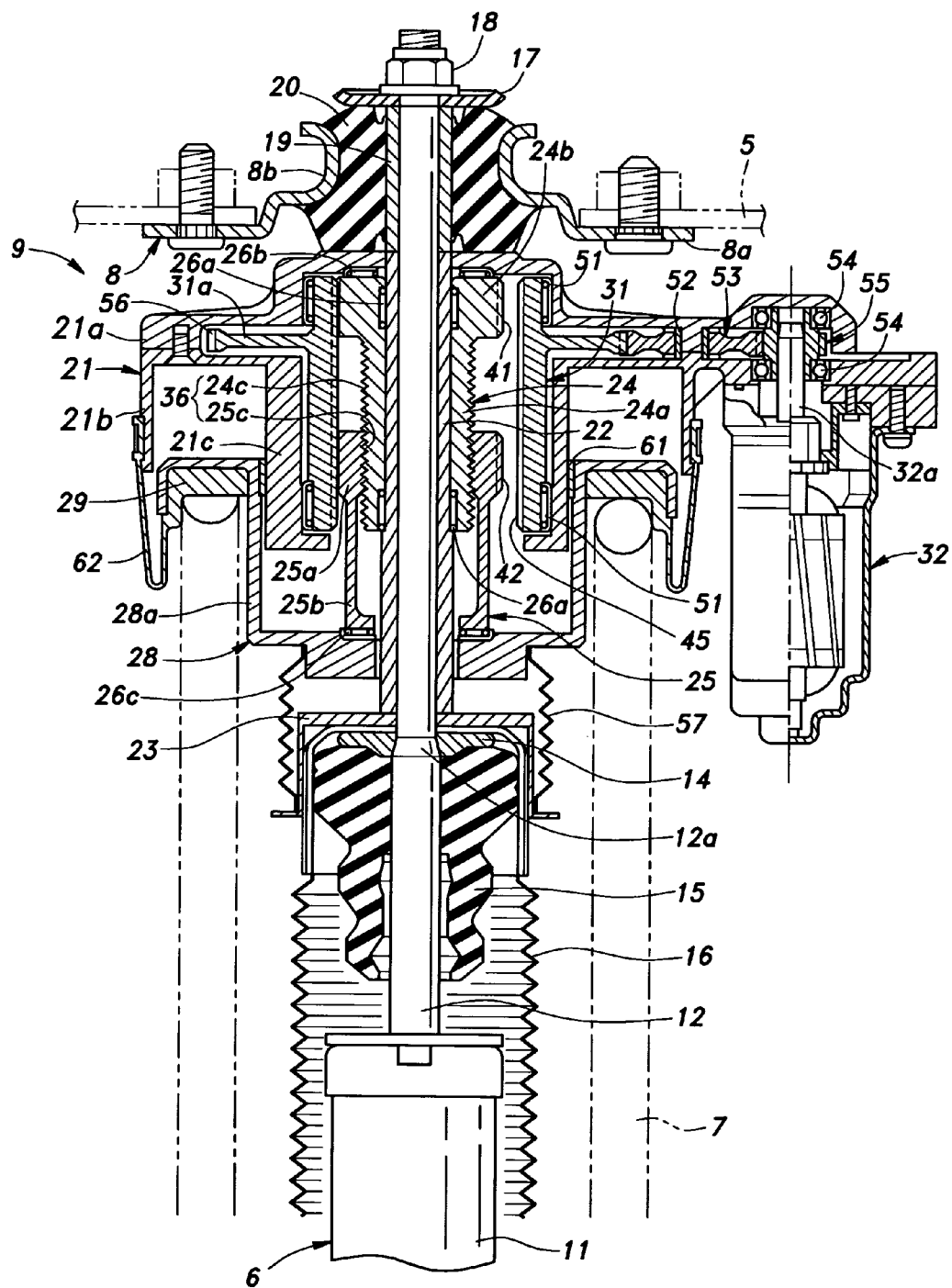
FIG. 8 is a view similar to FIG. 2 showing the fourth embodiment of the present invention.

FIG. 8 shows a fourth embodiment of the present invention which is similar to the previous embodiments. In the following description of this embodiment in reference to FIG. 8, the parts corresponding to those of the previous embodiments are denoted with like numerals without repeating the description of such parts.

This embodiment differs from the third embodiment in that the drive shaft 31 is provided with a single drive gear 45 which commonly meshes with both the first and second driven gears 41 and 42 which are similar to those of the previous embodiment. The drive gear 45 is accordingly provided with an adequate gear width that accommodates the simultaneous meshing with the two driven gears 41 and 42 and the expected axial movement of the second driven gear 42. The first and second driven gears 41 and 42 may have a same tooth profile and module, but may have different profile shifts (addendum modification coefficient) to ensure a favorable meshing of the gears. In this embodiment, because only a single drive gear 45 is required to be prepared, the manufacturing cost of the drive shaft 31 can be reduced.

Figure 9:
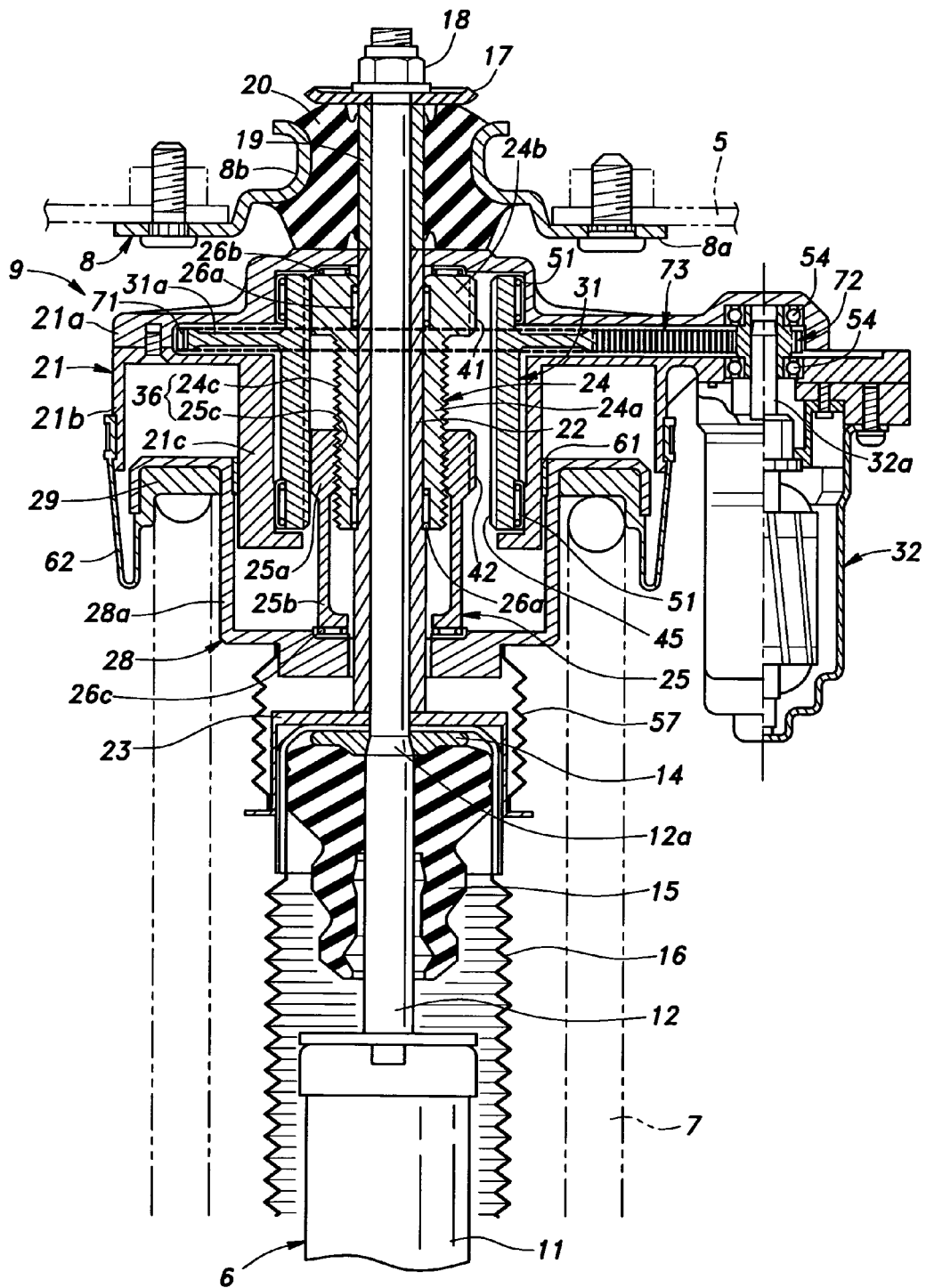
FIG. 9 is a view similar to FIG. 2 showing the fifth embodiment of the present invention.

FIG. 9 shows a fifth embodiment of the present invention which is similar to the previous embodiments. In the following description of this embodiment in reference to FIG. 9, the parts corresponding to those of the previous embodiments are denoted with like numerals without repeating the description of such parts.

This embodiment differs from the previous embodiment in that the idler gear is eliminated and a cogged belt 73 is passed around the drive sprocket 72 formed on the output shaft 32a of the electric motor 32 and a driven sprocket 71 formed around the disk portion 31a of the drive shaft 31. The elimination of the idle gear contributes to a reduction in the cost, weight and size of the system.

Figure 10:
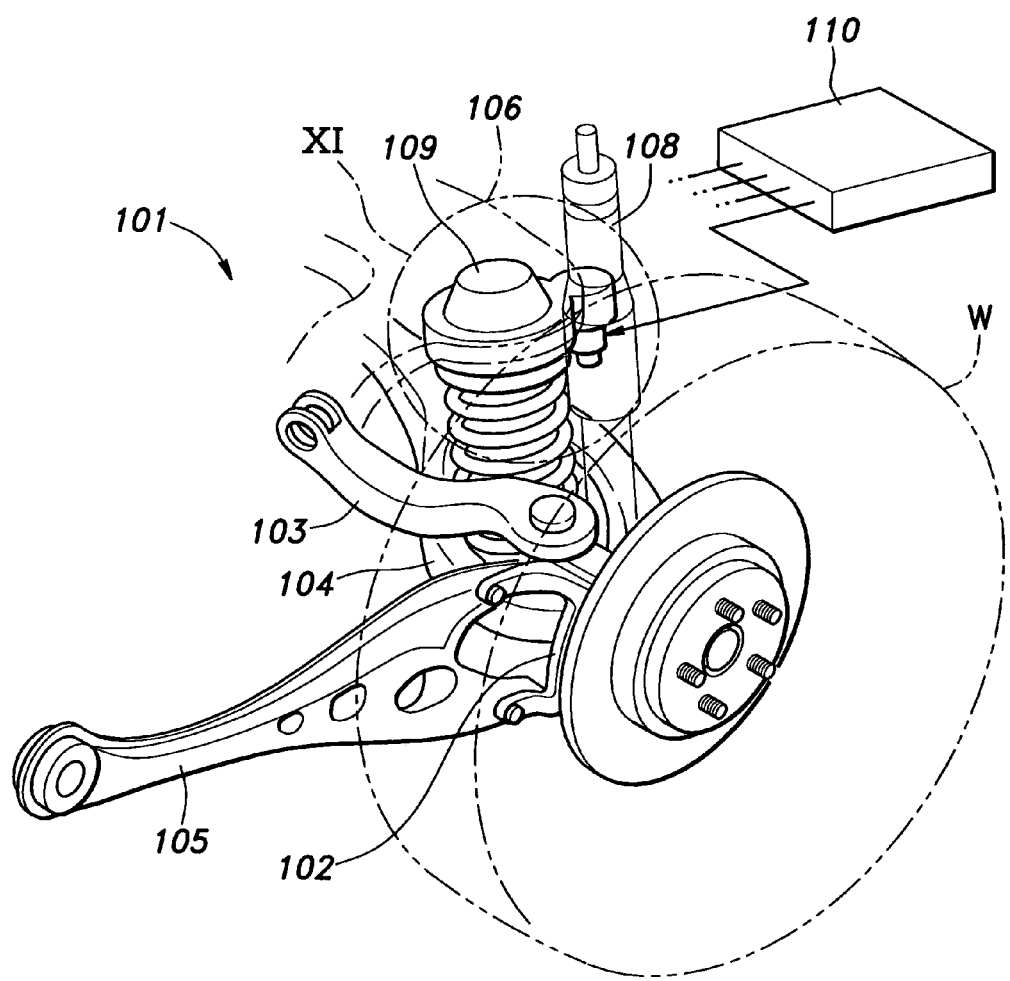
FIG. 10 is a fragmentary perspective view of a rear wheel suspension system to which the sixth embodiment of the present invention is applied.

FIG. 10 shows a front wheel suspension system 101 for an automobile to which the sixth embodiment of the present invention is applied. This suspension system is normally called as a multi link type and widely used for the rear wheels of automobiles currently on the market. This suspension system 101 comprises a knuckle 102 that rotatably supports a wheel W via a hub bearing (not shown in the drawing), an upper arm 103 that connects an upper end of the knuckle 102 to a part of the vehicle body, a lower arm 104 that connects a lower end of the knuckle 102 to another part of the vehicle body, a trailing arm 105 that connects a front end of the knuckle 102 to the vehicle body, a coil spring 107 interposed between the lower arm 104 and a part of the vehicle body via a suspension member 106, a damper 108 interposed between the lower arm 104 and the vehicle body in a position slightly outboard of the coil spring 107 and a vehicle height adjusting system 109 interposed between the upper end of the coil spring 107 and suspension member 106. Numeral 110 denotes an electronic control unit which is mounted in the cabin or trunk room and is used for controlling the vehicle height adjusting system 109.

Figure 11:
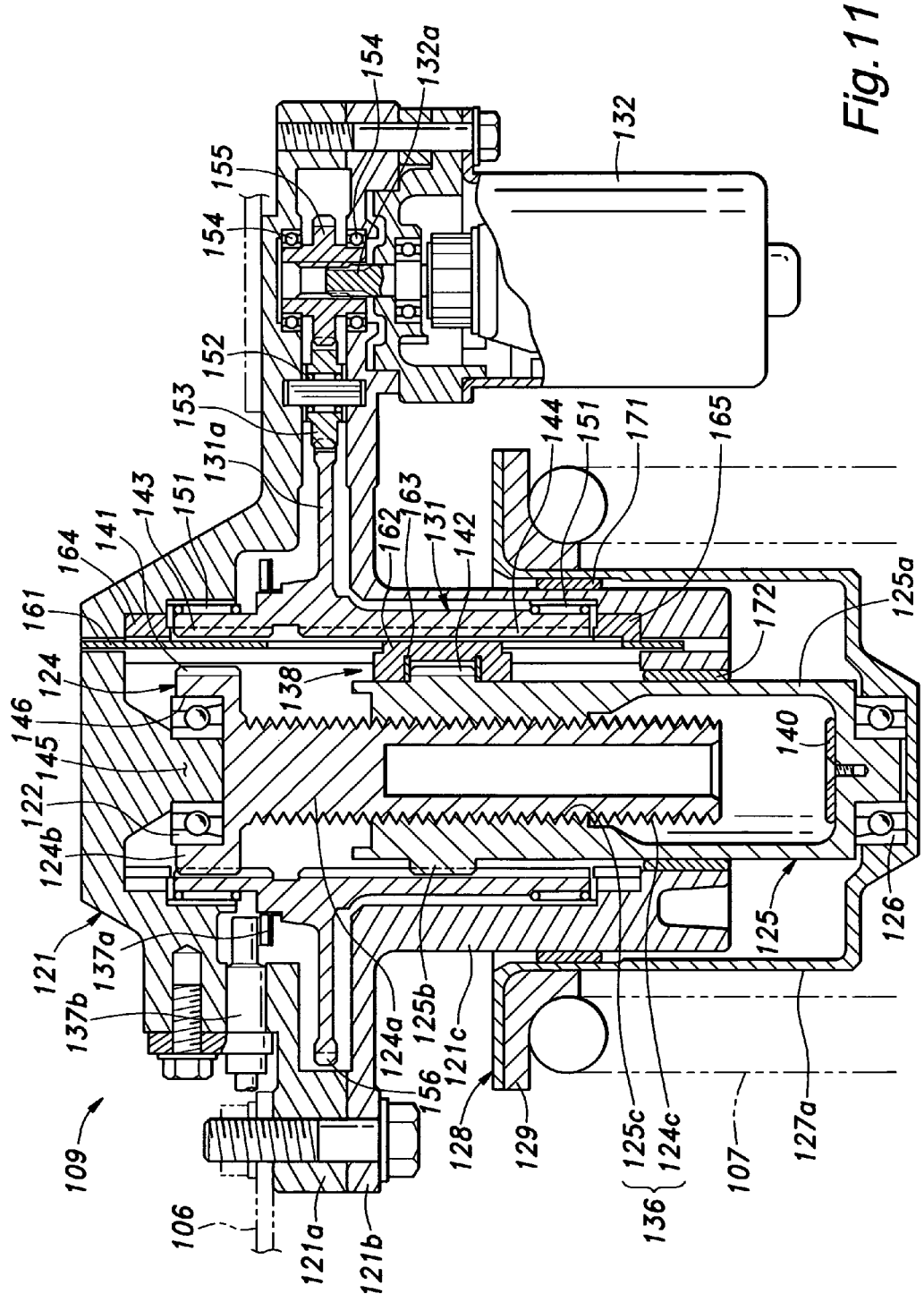
FIG. 11 is an enlarged vertical sectional view of a part of FIG. 10 indicated by XI.
Figure 12:
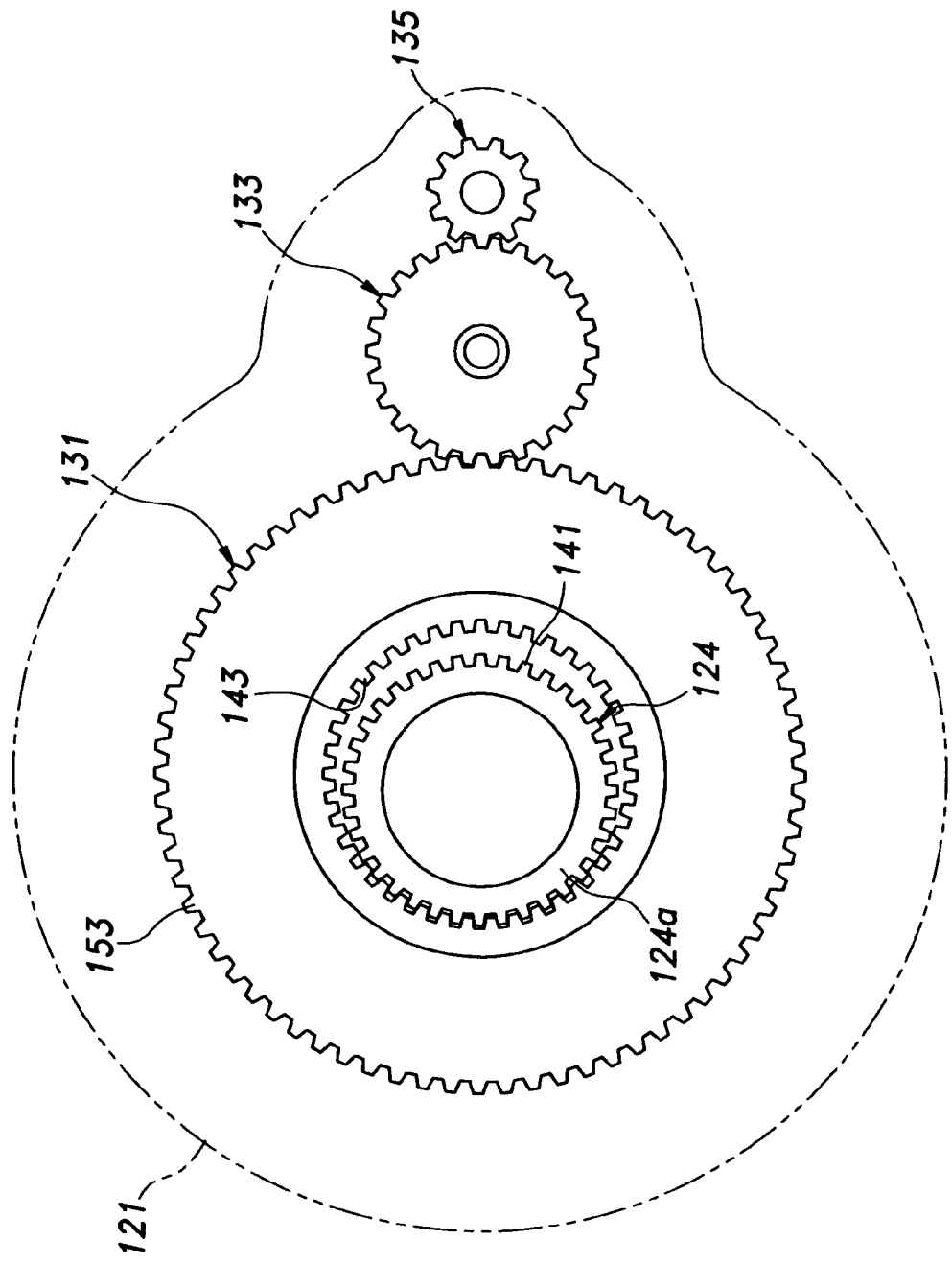
FIG. 12 is a cross sectional view showing the meshing relationship between the various gears in a single plane.

Referring to FIGS. 11 and 12, the vehicle height adjusting system 109 comprises a housing 121 formed by an upper housing half 121a shaped like an inverted shallow cup and a lower housing half 121b attached to the downward facing surface of the peripheral part of the upper housing half 121a and provided with a hollow cylindrical extension 121c depending from a central part of the lower housing half 121b.

A first rotor 124 comprises a shaft portion 124a formed with a male thread 124c around an outer periphery thereof and a disk portion 124b having a relatively larger diameter and formed in an upper end of the shaft portion 124a in a coaxial relationship. The disk portion 124b is formed with a first driven gear 141 around an outer periphery thereof. The first rotor 124 is supported in the housing 121 so as to be rotatable around a vertical axial line via an angular bearing 122 having an inner race fitted onto a boss 145 coaxial to the first rotor 124 and depending from the top wall of the upper housing half 121a and an outer race fitted into a coaxial recess 146 formed in the upper end of the disk portion 124b.

A second rotor 125 comprises a cylindrical cup-shaped main body 25a formed with a female thread 125c in an inner periphery thereof that engages with the male thread 124c of the first rotor 124 and a disk portion 125b formed in an upper part of the main body 125a and formed with a second drive gear 142 around an outer periphery thereof. The female thread 125c jointly with the male thread 124c forms a feed screw mechanism 136 that causes a relative axial movement between the first and second rotors 124 and 125 when the first and second rotors 124 and 125 are turned around a common axial line relative to each other. A stopper member 140 made of resilient polymer material is placed in the bottom end of the hollow interior of the second rotor 125 to abut the bottom end of the first rotor 124 in a resilient manner when the second rotor 125 is lifted to the upper limit.

The spring seat retainer 128 of this embodiment is provided with a central extension 128a that is cylindrical in shape and closed at a lower end thereof. The bottom end of the central extension 128a is provided with a recess that receives an outer race of an angular ball bearing 126 that rotatably supports the second rotor 125. The bottom end of the second rotor 125 is provided with a central boss extending therefrom which is received in the inner race of the angular ball bearing 126. A cylindrical slide bearing 171 is attached to an upper part of the inner circumferential surface of the central extension 128a to slidably bear upon the outer circumferential surface of the cylindrical extension 121c of the housing 121. A similar cylindrical slide bearing 172 is attached to the inner circumferential surface of a lower part of the drive shaft 131 to bear upon the outer circumferential surface of the second rotor 125. These cylindrical slide bearings 171 and 172 are preferably made of low friction material such as oil-impregnated polyacetal resin.

An electric motor 132 is attached to the lower housing half 121b and is provided with an output shaft 132a that projects into the interior of the housing 121 and rotatably supported by ball bearings 154. The output shaft 131a is fitted with a drive pinion 155 which meshes with an idler gear 153 rotatably supported by a slide radial bearing 152.

Centrally inside the housing 121 is rotatably received a drive shaft 131 which is cylindrical in shape and has an axial center line slightly offset from the center line of the first and second rotors 124 and 125 which are coaxial with each other. A pair of needle bearings 151 are interposed between the outer periphery of the drive shaft 131 and the inner periphery of the housing 121. A radial disk 137a is attached to an upper part of the drive shaft 131, and a rotary encoder 137b is attached to the upper housing half 121a and extends into the housing 121 so as to oppose the radial disk 137a. When the rotary encoder 137b consists of a proximity sensor, the radial disk 137a may consist of a crown gear or other type of gear having a prescribed number of teeth. The rotary encoder 137b detects the rotational angle of the drive shaft 131, and forwards the detected angle to the drive control unit 110.

The drive shaft 131 is formed with a first drive gear 143 and a second drive gear 144 in an axially spaced relationship on an inner periphery thereof. The drive shaft 131 is further provided with an external radial flange 131a in an upper part thereof which is formed with an input gear 156 that meshes with the idler gear 153. In this embodiment, the input gear 156 has 72 teeth, and the drive pinion 55 has 11 teeth so that the gear ratio Rp of the first gear reduction mechanism interposed between the output shaft 132a of the electric motor 132 and the drive shaft 131 is given by the following relationship.

$$Rp=72/11=6.545$$

Figure 13:
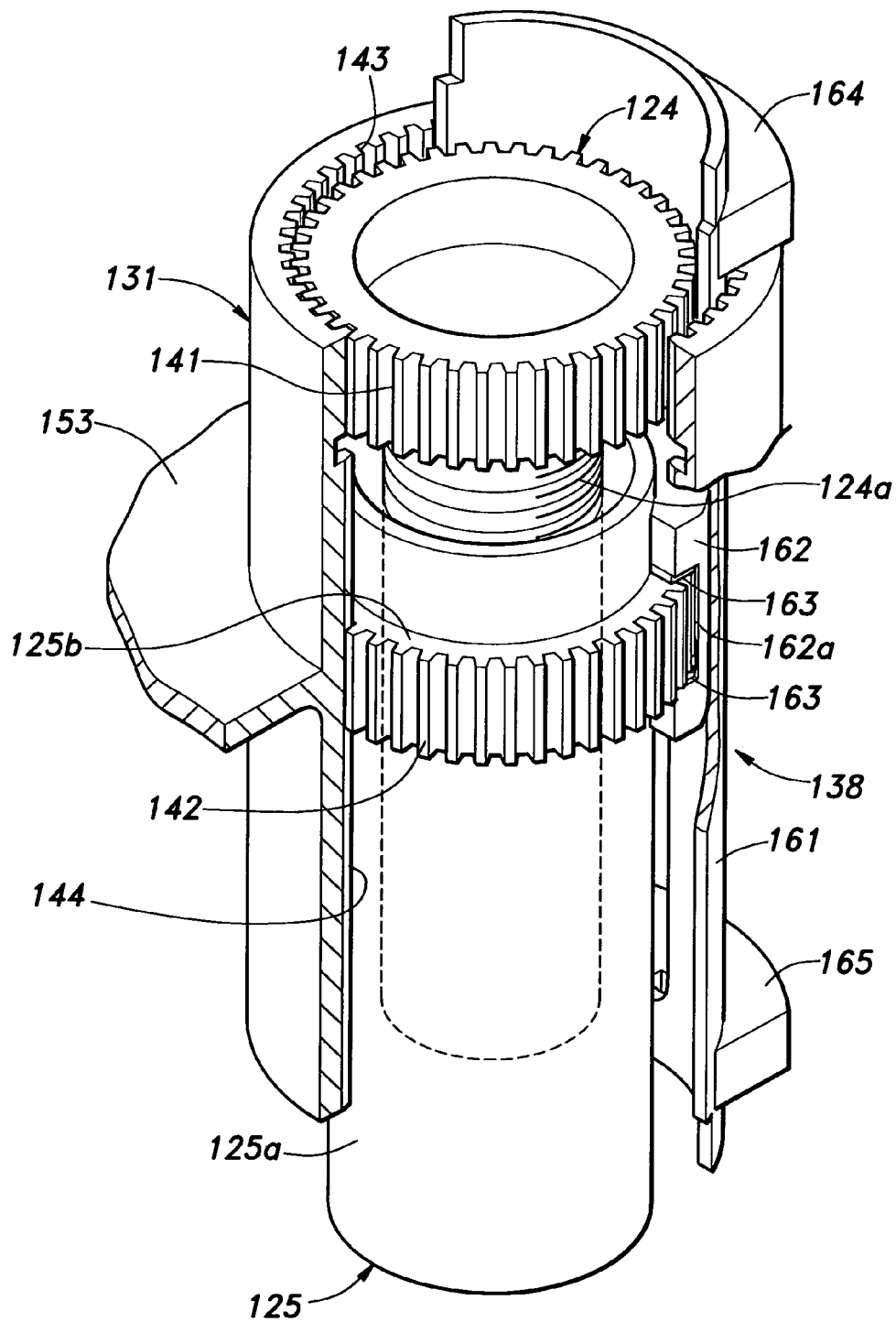
FIG. 13 is a partly broken away perspective view showing the radial support mechanism.
Figure 14:
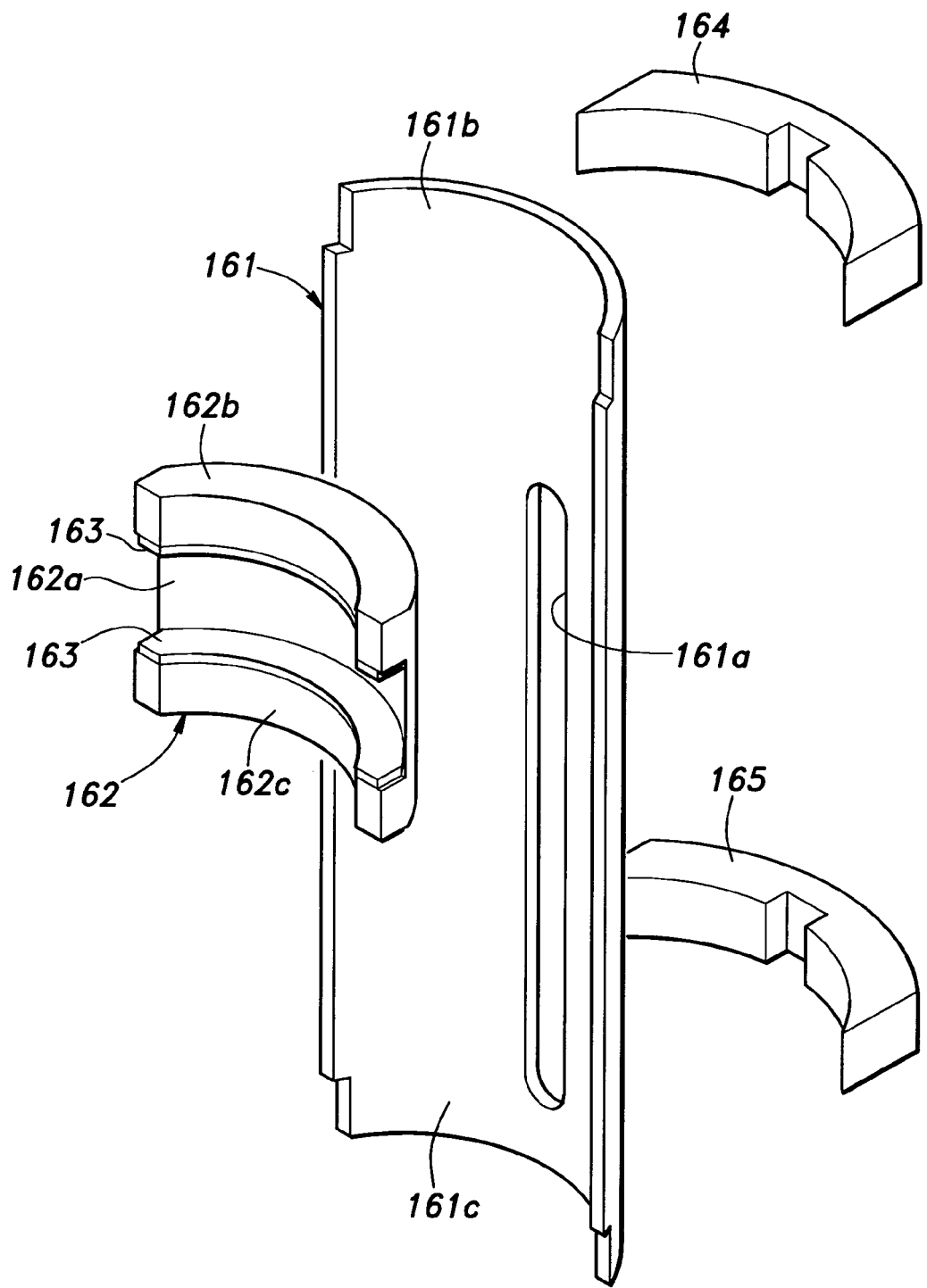
FIG. 14 is an exploded perspective view of the essential components of the radial support mechanism.
Figure 16:
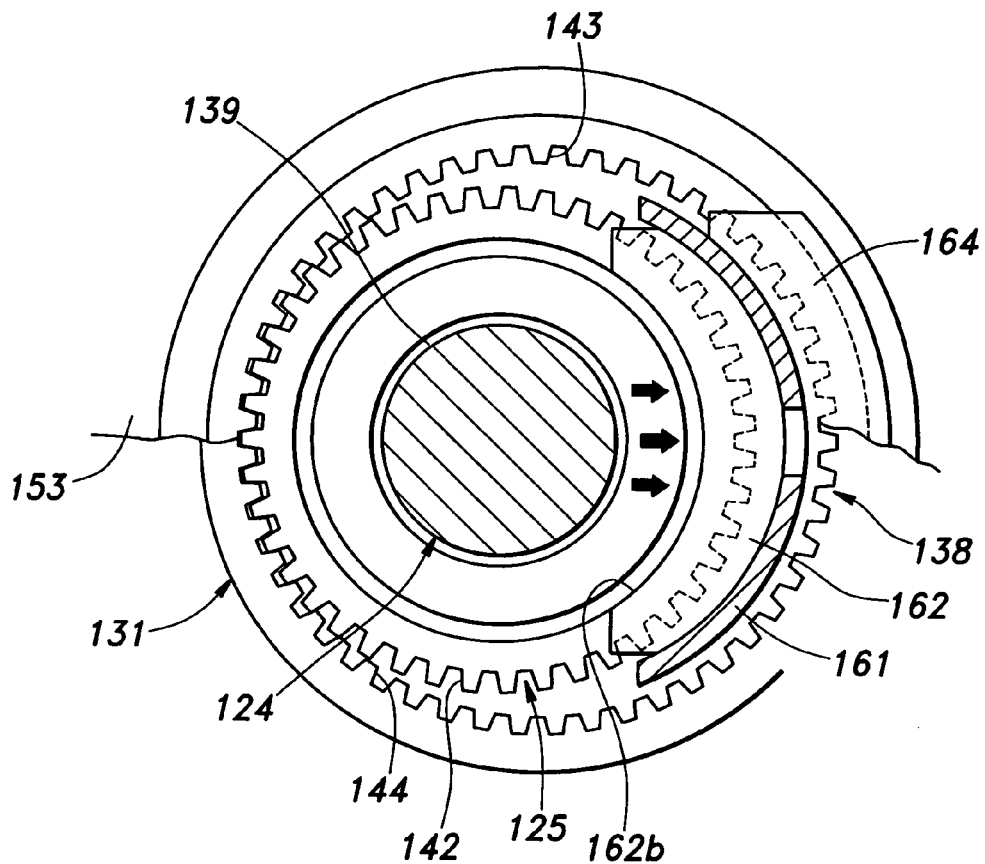
FIG. 16 is a cross sectional view showing the mode of operation of the radial support mechanism.

This vehicle height adjusting system 109 further comprises a radial support mechanism 138 that supports the second rotor 125 with respect to the drive shaft 131 so as to enable the two parts to rotate relative to each other around axial lines that are parallel to each other but laterally slightly offset to each other. As shown in FIGS. 13 and 14 also, the radial support mechanism 138 comprises a guide plate 161 (made of steel plate) which is fixedly secured to the housing 121 and extends along the axial direction thereof. The guide plate 161 is curved in a concentric relationship to the axial line of the rotors 124 and 125, and is provided with a central guide slot 161a extending longitudinally. The upper and lower ends 161b and 161c of the guide plate 161 is configured to be fitted into corresponding slots formed in the upper and lower housing halves 121a and 121b, respectively.

A slider 162 typically made of plastic material (preferably impregnated with lubricating oil) is guided axially by the inner concave surface of the guide plate 161 via a conformal back side of the slider 162. A vertically elongated projection 162d is formed on the back side of the slider 162 so as to prevent a relative rotation between the guide plate 161 and slider 162 around the axial line of the rotors and define the upper and lower limits of the axial travel of the slider 162 by the abutting of the projection 162d with the closed upper and lower ends of the guide slot 161a, respectively. The front side of the slider 162 is provided with a circumferentially extending recess 162a that snugly receives the radial disk 125b of the second rotor 125. A washer 163 is interposed between each end surface of the radial disk 125b and the opposing side face of the recess 162a to evenly distribute the axial pressure of the radial disk 125b acting upon the slider 162. The slider 162 is located at 180 degrees opposite to the position at which the second driven gear 142 formed on the outer periphery of the radial disk 125b meshes with the second drive gear 144 of the drive shaft 131 to urge the two gears 143 and 144 into a meshing engagement by making use of the resiliency of the guide plate 161. The urging pressure may be adjusted by selecting the thickness of a pair of adjusting blocks 164 and 165 that are interposed between the upper and lower ends of the guide plate 161 and opposing inner wall surfaces of the housing 121.

Thus, the radial support mechanism 138 favorably supports the radial or lateral reaction that is produced between the drive shaft 131 and second rotor 125 even though the meshing point between the drive shaft 131 and second rotor 125 moves vertically during operation by virtue of the use of the slider 162 that can move vertically to accommodate the vertical movement of the second rotor 125 while effectively supporting the lateral load acting on the second rotor 125.

As best illustrated in FIG. 12, the first drive gear 143 meshes with the first driven gear 141, and the second drive gear 144 similarly meshes with the second driven gear 143 although this gear pair is hidden from view in FIG. 12. The first driven gear 141 of the first rotor 124 is provided with Za number of teeth (35 teeth in the illustrated embodiment), and the second driven gear 142 of the second rotor 125 is provided with Zb number of teeth (36 teeth in the illustrated embodiment). The first drive gear 143 of the drive shaft 131 is provided with Zc number of teeth (40 teeth in the illustrated embodiment), and the second drive gear 144 of the drive shaft 131 is provided with Zd number of teeth (40 teeth in the illustrated embodiment). The first drive gear 143 and first driven gear 141 have a substantially same width or axial length, but the second drive gear 144 is given with a substantially greater axial length that the first drive gear 143 so that the meshing relationship between the two gears 143 and 144 may be maintained even when the second rotor 125 is caused to move axially relative to the first rotor 124. In the following description, the first drive gear 143 and first driven gear 141 are called as a first gear pair, and the second drive gear 144 and second driven gear 142 are called as a second gear pair.

The mode of operation of the sixth embodiment is described in the following with reference to FIG. 11. When the electric motor 132 is turned by a drive current supplied by the drive control unit 10, the drive pinion 155 attached to the output shaft 132a of the electric motor 132 starts turning, and this rotational movement is transmitted to the drive shaft 131 via the first gear reduction mechanism at the gear ratio of Rp=6.545 as mentioned earlier. The rotation of the drive shaft 132a is transmitted to the first rotor 124 via the first gear pair consisting of the first drive gear 143 and first driven gear 141 that mesh with each other, and to the second rotor 125 via the second gear pair consisting of the second drive gear 144 and second driven gear 142. The gear ratios R1 and R2 of the first and second gear pairs, respectively, are given by the following relationships.

$R1 = Za/Zc = 36/40 = 0.900$ (the first gear pair)

$R2 = Zb/Zd = 35/40 = 0.875$ (the second gear pair)

The two gear ratios differ from each other so little that the difference between the rotational angles between the two rotors for a given rotational angle of the drive shaft 131 is very small. The overall gear ratio Rd between the first rotor 124 and second rotor 125 is given by the following relationship.

$$Rd = RP \cdot R1 \cdot R2 / (R1 - R2)$$
$$= 6.545 \cdot 0.900 \cdot 0.875 / (0.900 - 0.875)$$
$$= 206.2$$

The relative rotation between the first rotor 124 and second rotor 125 causes the second rotor 125 to be axially (vertically) displaced relative to the first rotor 124, and this causes the spring seat retainer 128 to be moved vertically. Because the lower face of the second rotor 125 abuts the spring seat retainer 128 which in turn engages the upper spring seat 129, the upper spring seat 129 is caused to move vertically in either direction and this changes the distance between the suspension member (vehicle body) 106 and lower arm 104 (wheel W) and hence the vehicle height accordingly.

The radial support mechanism 138 supports the reaction of the meshing engagement between second driven gear 142 of the second rotor 125 and second drive gear 144 of the drive shaft 131 so that the first rotor 124 and second rotor 125 can be maintained in a precise axial alignment and an uneven loading or uneven wear of the screw feed mechanism can be effectively avoided. The reaction of the meshing engagement between first driven gear 141 of the first rotor 124 and first drive gear 143 of the drive shaft 131 is also favorably supported by the housing 121 because the axial position at which the disk portion 124b of the first rotor 124 is supported by the boss 145 of the upper housing half substantially coincides with the axial position of the gear meshing.

Figure 18:
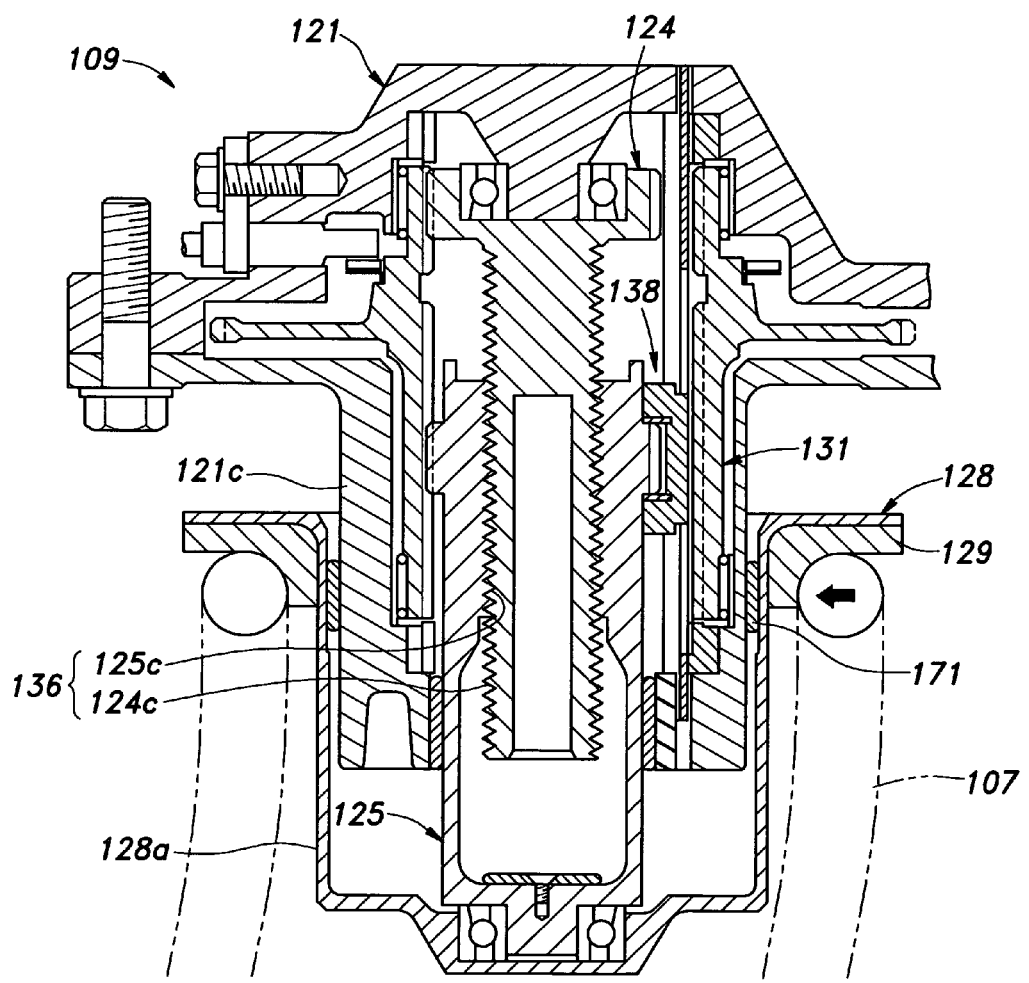
FIG. 18 is a view similar to FIG. 11 showing the mode of operation of the vehicle height adjusting system of the present invention.

As the vehicle travels over irregular road surfaces and the wheel W moves vertically, the swinging movement of the lower arm 104 causes a deformation of the spring 107 in such a manner that the upper spring seat 129 retaining the upper end of the coil spring 107 applies a radial or lateral force as indicated by the solid arrow in FIG. 18. However, because the spring seat retainer 128 is supported by the cylindrical portion of the housing 121 via the cylindrical slide bearing 171, this force can be favorably supported by the housing 121. Thereby, the first and second rotors can be maintained in a precise axial alignment, and this prevents any uneven loading or any premature wear of the screw feed mechanism 136.

In the sixth embodiment also, because the first and second rotors 124 and 125 are received within the hollow interior of the drive shaft 131, and the first and second driven gears mesh with the corresponding first and second drive gears that are formed as internal gears, the outer dimension of the housing 121 can be minimized, and this contributes to a compact design of the vehicle height adjusting system 109. Also, because the gears are allowed to more intimately mesh with each other, the load acting on each gear tooth can be reduced and noise emission can also reduced. As an additional advantage, it becomes easier to retain lubricating grease on the gear teeth.

Figure 17:
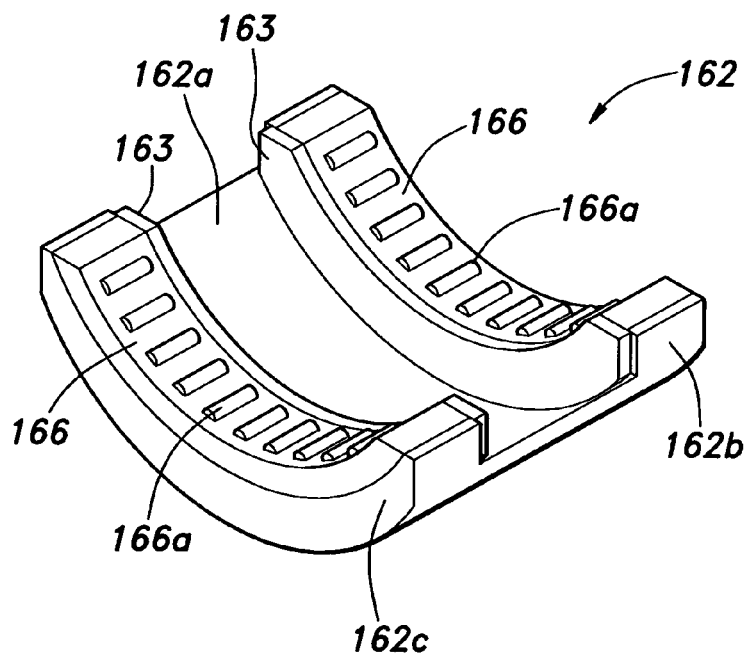
FIG. 17 is a perspective view of the modified embodiment of the slider.

FIG. 17 shows a modified embodiment which differs from the previous embodiment in that a pair of needle bearings 166 each provided with a plurality of needle members 166a are provided on the front surface of the slider 162 at which the slider 162 abuts the outer circumferential surface of the second rotor 125 so that the friction between them is minimized, and this contributes to an improvement of the durability of the vehicle height adjusting system.

Although the present invention has been described in terms of preferred embodiments thereof, it is obvious to a person skilled in the art that various alterations and modifications are possible without departing from the scope of the present invention which is set forth in the appended claims.

For instance, some of the embodiments were applied to front wheel suspension systems and other embodiments were applied to rear wheel suspension systems in the foregoing description, but all of the embodiments can be equally applicable to both front and rear wheel suspension systems. Also, the present invention can be applied to vehicles having any number of wheels. The vehicle height adjusting system of the present invention disclosed in the foregoing description was placed between the upper end of the coil spring and vehicle body, but may also be placed between the lower end of the coil spring and a wheel side member such as a lower arm or a part of a knuckle.

The suspension spring in the foregoing embodiments consisted of coil springs, but may also consist of leaf springs or torsion springs by suitably modifying the present invention. The particular types of the wheel suspension systems appearing the foregoing embodiments are also only exemplary, and any types of wheel suspension systems can be incorporated with the vehicle height adjusting system of the present invention. It is also with the purview of the present invention to use other mechanisms for converting the rotational movement of the final gear to a linear displacement of an end of the suspension spring such as a ball screw feed mechanism, a cylindrical cam and other equivalent mechanisms.

The contents of the original Japanese patent application on which the Paris Convention priority claim is made for the present application are incorporated in this application by reference.

The invention claimed is:

1. A vehicle height adjusting system for a wheel suspension system that is configured to be interposed between one of a vehicle end member and a wheel end member, and an opposing end of a suspension spring, the vehicle height adjusting system comprising:
    a housing connected to said one of the vehicle end member and wheel end member;
    a spring seat retainer connected to said opposing end of the suspension spring;
    a first rotor rotatably supported by the housing and provided with a first driven gear along an outer periphery thereof;
    a second rotor rotatably supported by the spring seat retainer and provided with a second driven gear along an outer periphery thereof, the second rotor being coaxially disposed in relation with the first rotor around a common axial line and joined with the first rotor via a threading coupling that converts a relative rotation around the common axial line into a relative linear movement of the first and second rotors towards and away from each other along the common axial line;
    a drive shaft rotatably supported by the housing and provided with a first drive gear meshing with the first driven gear and a second drive gear meshing with the second driven gear; and
    a drive mechanism mounted on the housing for turning the drive shaft;
    a gear ratio between the first drive gear and first driven gear being different from a gear ratio between the second drive gear and second driven gear,
    wherein the second drive gear is provided with such a width as to ensure meshing with the second driven gear over an entire linear axial travel of the second rotor relative to the first rotor, and
    wherein the drive shaft comprises a cylindrical member and the first and second drive gears are formed on an inner periphery of the cylindrical member as internal gears.

2. The vehicle height adjusting system according to claim 1, wherein the first rotor is provided with a first disk around which the first driven gear is formed, and a central shaft integrally extending axially from the disk in a coaxial relationship and formed with a male thread for the threading coupling on an outer periphery thereof, and the second rotor is provided with a second disk around which the second driven gear is formed, the second rotor being provided with a central bore formed with a female thread that engages the male thread of the first rotor.

3. The vehicle height adjusting system according to claim 1, wherein the first rotor is provided with a central bore for passing a damper rod of a damper therethrough.

4. The vehicle height adjusting system according to claim 3, wherein the first rotor is rotatable supported by the damper rod via a radial bearing.

5. The vehicle height adjusting system according to claim 1, further comprising a radial force supporting mechanism provided between an inner periphery of the drive shaft and an outer periphery of the second rotor at a location that diagonally oppose a location at which the second drive gear meshes with the second driven gear, the radial force supporting member including a guide plate supported by the housing and a slider guided by the guide plate in an axially slidable but rotationally fast manner, the slider engaging the second rotor in an axially fast but circumferentially slidable manner.

6. The vehicle height adjusting system according to claim 5, wherein the guide plate is made of resilient material so as to resiliently urge the slider against an opposing surface of the second rotor.

7. The vehicle height adjusting system according to claim 1, wherein a bearing is interposed between an inner circumferential surface of the housing and an opposing outer circumferential surface of the second rotor.

8. The vehicle height adjusting system according to claim 1, wherein the spring seat retainer comprises a cylindrical extension depending from a lower end of a central part thereof and the housing comprises a cylindrical extension depending from a lower end of a central part thereof and received in the cylindrical extension of the spring seat retainer, a bearing being interposed between an inner circumferential surface of the cylindrical extension of the spring seat retainer and an outer circumferential surface of the cylindrical extension of the housing.

9. The vehicle height adjusting system according to claim 1, wherein the first rotor is provided with a first disk around which the first driven gear is formed, and a central shaft integrally extending axially from the disk in a coaxial relationship and formed with a male thread for the threading coupling on an outer periphery thereof, and the second rotor is provided with a second disk around which the second driven gear is formed, the upper end of the first disk being formed with a recess coaxial with the first driven gear in which a boss depending from the opposing wall of the housing is rotatably received.

* * * * *